United States Patent [19]

Delatorre

[11] Patent Number: 4,924,701
[45] Date of Patent: May 15, 1990

[54] PRESSURE MEASUREMENT SYSTEM
[75] Inventor: Leroy C. Delatorre, Sugar Land, Tex.
[73] Assignee: Panex Corporation, Sugar Land, Tex.
[21] Appl. No.: 240,707
[22] Filed: Sep. 6, 1988
[51] Int. Cl.⁵ .......................... E21B 47/00; G01L 9/12
[52] U.S. Cl. ........................................ 73/151; 73/706; 73/722; 73/753; 361/283
[58] Field of Search ................. 73/706, 152, 155, 151, 73/724, 718, 708, 862.64; 361/283

[56] References Cited

U.S. PATENT DOCUMENTS

| 3,478,589 | 11/1969 | Birken | 361/283 |
| 3,911,902 | 10/1975 | Delpy | 73/724 |
| 4,545,254 | 10/1985 | Lawless et al. | 361/283 |

Primary Examiner—Donald O. Woodiel

[57] ABSTRACT

A pressure measurement system comprising a capacitance device whose outer interrelated capacitance plates are maintained in a relatively fixed position relative to one another while an intermediate capacitance plate responds to temperature. The plates are in a restricted enclosure containing a gas dielectric medium. The pressure of the gas dielectric medium (and consequently the density of the gas) is controlled as a function of a pressure to be measured. By measurement of capacitance relationships as a function of the temperature and density of the gas dielectric medium, a pressure measurement is obtained. The system is constructed with like types of materials where the capacitance device is in an enclosure chamber which is immersed in a pressure media. The capacitance device is constructed with a symmetrical arrangement to balance out effects of gravity or vibration. Construction of micro components utilizes an electrostatic bonding system which eliminated arcing during bonding.

52 Claims, 11 Drawing Sheets

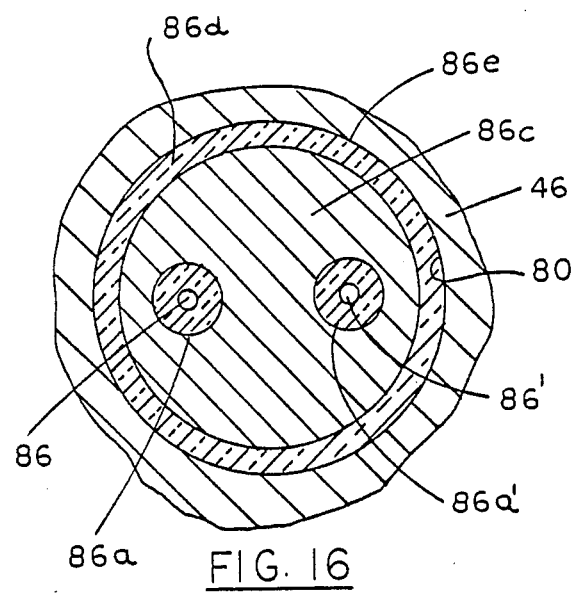
FIG. 16
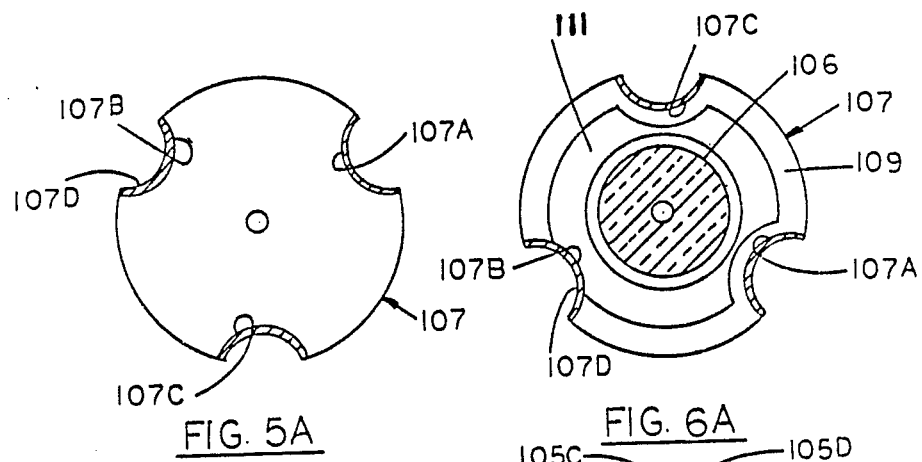
FIG. 5A
FIG. 6A
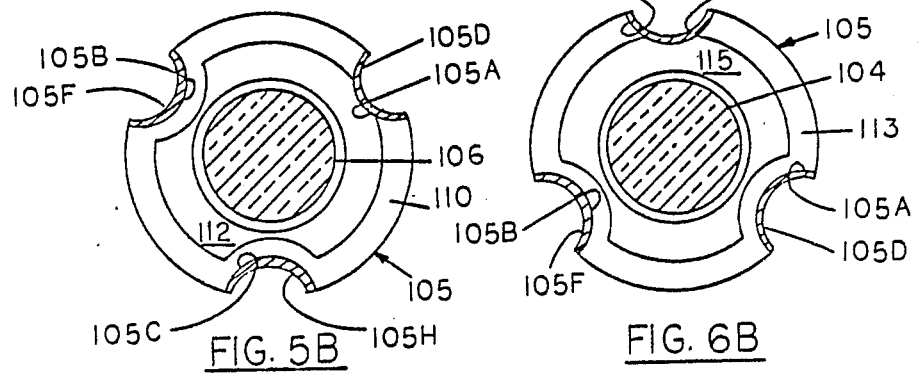
FIG. 5B
FIG. 6B

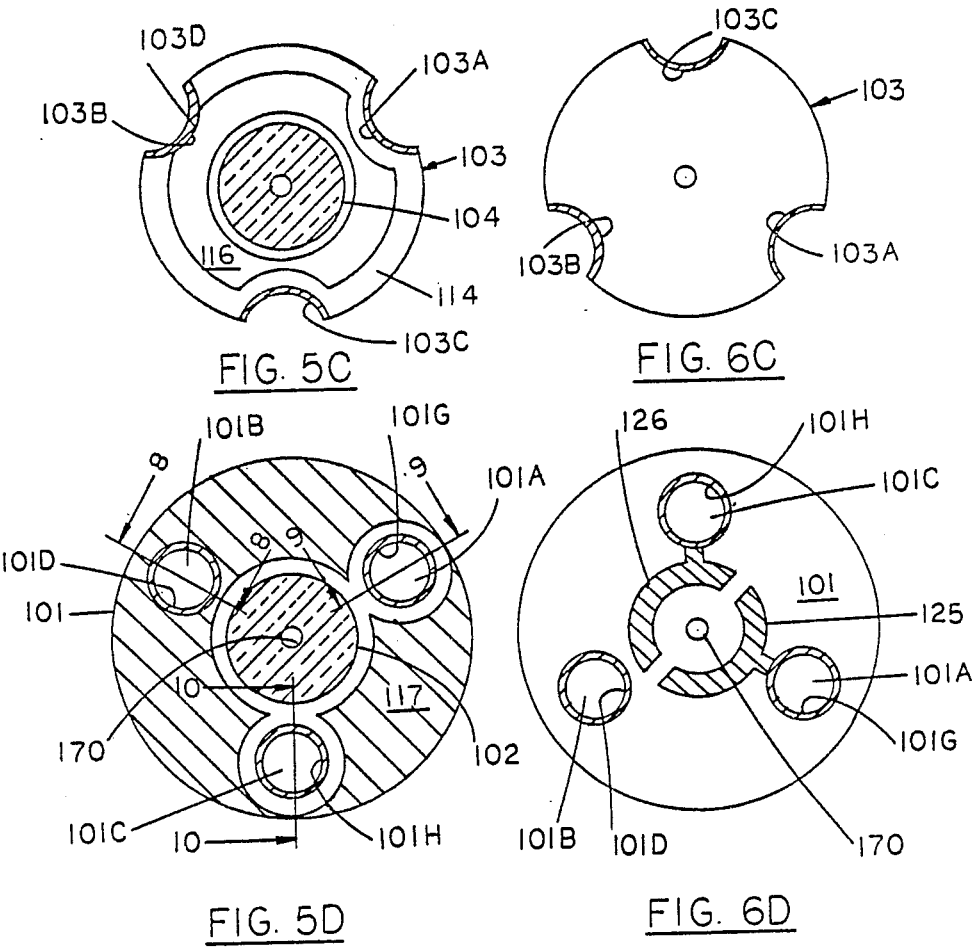

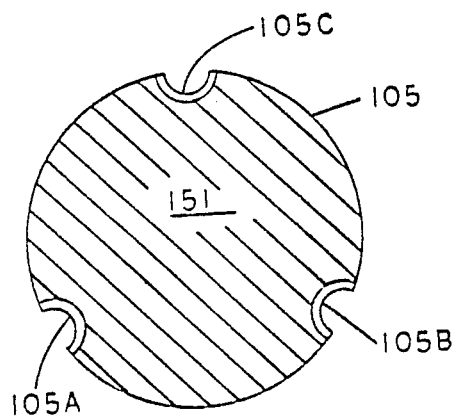 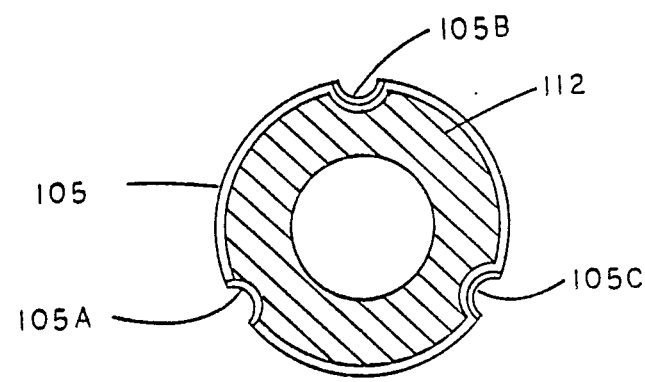
FIG. 14A  FIG. 14B
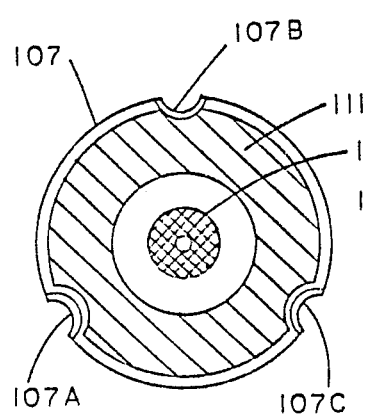 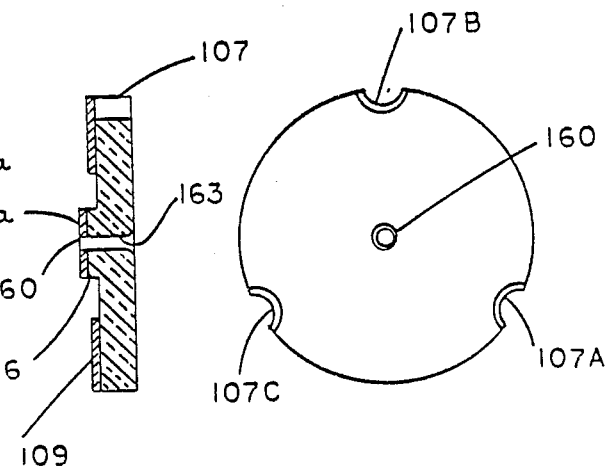
FIG. 14C  FIG. 14D  FIG. 14E

PRESSURE MEASUREMENT SYSTEM

FIELD OF THE INVENTION

This invention relates to measurement systems, and more particularly to systems for measuring pressure as a function of the density of a gas in a capacitor measurement device without requiring any pressure related deflection in the measurement device.

BACKGROUND OF THE INVENTION

Pressure measurement is a well known art and there are a variety of devices which function to measure pressure and which vary in scope from devices for measuring very small changes in pressure to devices for measuring very large changes of pressure. In discussing pressure measurement, it should be borne in mind that pressure is directly related to force, since pressure is a force per unit area exerted on a surface, and thus pressure measurements are functionally related to force measurements.

An exhaustive review of various types of pressure measurement devices is not necessary for the background of the present invention because the present invention is involved with a measurement technique and measurement device which, to applicant's belief, has not heretofore been utilized i.e., a measurement of pressure based upon a relationship of the temperature and the density of a gaseous dielectric medium in a capacitor device. Conventional pressure sensors rely upon stress dependent readings. That is, some element, such as a measurement diaphragm, is stressed as a function of pressure to produce a measurement parameter. Factors such as creep and repeatability of the diaphragm affect the accuracy of these measurements. High pressure measurements typically generate high stress factors in the measuring device. The present invention involves a virtually static measurement device in which the pressure measurement is made without requiring any pressure related deflection in the capacitor device.

SUMMARY OF THE PRESENT INVENTION

In the present invention a capacitor device is provided for measuring a medium under pressure where the capacitor device has fixed outer capacitor plates and an intermediate capacitor plate. The capacitor plates develop two interrelated capacitance measurements as a function of the temperature of a gaseous medium in the capacitor device. The intermediate capacitor plate member is constructed to shift or displace relative to the outer capacitor plates as a defined function of temperature to obtain the interrelated capacitance measurements. The outer capacitor plates and intermediate capacitor plate are related by a defined total capacitance for the capacitor device where the total capacitance is a function of the dielectric value of the gaseous medium.

The internal support mechanism for the capacity plates of the capacitor device is constructed from a similar material and includes cylindrically shaped outer support members which are equally spaced from an intermediate member by central posts thereby forming two annular gaps. The intermediate capacitor plate support member is a composite construction of two disc parts of the same material. One of the disc parts is treated so as to have a different coefficient of expansion in response to temperature. Thus, the two combined disc parts function in response to temperature somewhat analogous to the function of a 'bi-metal' strip except that the flexure movement of the combined disc parts is extremely small.

The cylindrically shaped support mechanism has angularly displaced, peripheral indentions in the support members, preferably at 120° from one another, each of which have thick film metal coatings (i.e. metalized film applied in paste form) which selectively contact thin film metal coatings on facing surfaces in each of the gaps (i.e. sputtered metal films) where the thin films form the capacitance plates for two capacitors. Microwires in the indentations provide for electrical output to a shielded or guarded connector device.

The housing enclosure for the capacitor device is also constructed from similar materials although this is not entirely necessary. The housing enclosure for the capacitor device is customized to reduce the volume of gas dielectric medium required in the housing enclosure.

A base support member forms a support mechanism to independently support the capacitance sensor in the housing enclosure free of external stresses. The housing enclosure is immersed in the pressure media which is typically a liquid. The pressure of the pressure media is translated by a diaphragm device to compress the gas in the housing enclosure. The total capacitance of the device is a function of the dielectric value of the gas while the two capacitance values are a function of the temperature of the gas. The dielectric value of the gas is a function of the pressure and temperature of the gas. The immersion of the housing enclosure provides for pressure equilibrium on the enclosure. The diaphragm construction is arranged to provide for sufficient gas expansion for the ranges of pressure to be measured.

A reference transducer device which provides a capacitance value for a vacuum is provided for electronically eliminating coefficients or factors induced into the electrical measurements by effects of the electronic circuitry.

The various supports of the capacitor device are joined together in a composite structure and are constructed from ZERODUR material (manufactured by Schott Glass). The composite structure of the supports is obtained by attaching materials with temperature and electrical current using a process sometimes referred to as anodic bonding.

The intermediate structure for the capacitor plates is constructed to flex in response to temperature and the intermediate structure is supported by central posts which permit peripheral flexure.

DESCRIPTION OF THE DRAWINGS

FIGS. 5 (A-D) are surface plan views taken along lines 5a—5a, 5b—5b, 5c—5c, 5d—5d of FIG. 3;

FIGS. 6 (A-D) are surface plan views taken along lines 6a—6a, 6b—6b, 6c—6c, 6d—6d of FIG. 3;

FIG. 14A is a plan view of a surface of one of the elements 105X of the sensor unit of the invention in a stage of manufacture;

FIG. 14B is a plan view of the outer surface of the element 105 of the sensor unit of FIG. 14A;

FIG. 14C is a plan view of one surface of the support element 107 in the sensor unit of the invention;

FIG. 14D is a side view in cross-section of the support element 107 of FIG. 14C;

FIG. 14E is a plan view of the other surface of the element 107 of FIG. 14C;

FIG. 16 is a view in reduced cross-section and taken along line 16—16 of FIG. 3.

DESCRIPTION OF THE PRESENT INVENTION

Certain background will be helpful in understanding the present invention. The present invention is concerned with high accuracy and resolution for pressure measurements. Such accuracy is important to measurements of high pressures and small changes of pressure. For example, pressure measurements made in an underground oil reservoir may be required to sense the change in formation fluid pressure for as little as two psia over a two day period or time interval. This invention can measure such small changes in pressure with a high degree of accuracy and under a wide variety of borehole conditions and environments. The present invention involves a measurement of the properties of a gaseous dielectric medium between capacitance plates as a function of the pressure and temperature of such dielectric medium where the outer capacitance plates are fixed in position independent of pressure.

Figure 1A:
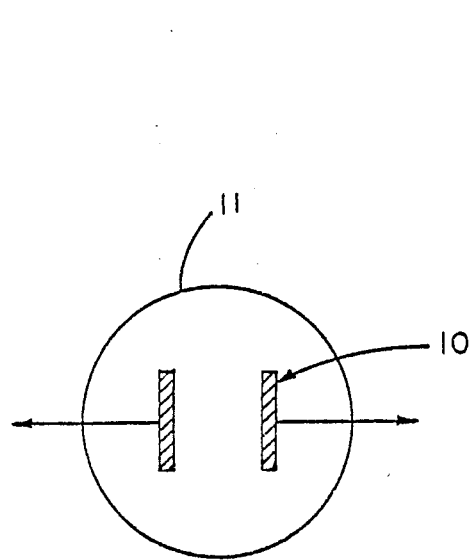
FIG. 1A is a schematic illustration of a capacitance device.

By way of background, capacitor 10 with fixed capacitance plates in an enclosure 11, as schematically illustrated in FIG. 1A, would have a capacitance value between the fixed capacitor plates which is a function of the dielectric constant 'E' of a gaseous dielectric medium located between the capacitance plates. The dielectric constant 'E', in turn, is proportionally related to the density of the gaseous dielectric medium. If the pressure of the gaseous dielectric medium is changed, the density of the gaseous dielectric medium changes between the capacitor plates. The change in density of the gaseous dielectric medium is a function of the pressure change at a stable temperature condition and can be predicted or determined. One way of determining the function is to calibrate the change in density for changes in pressure and develop a calibration curve or equation. If the temperature of the gaseous dielectric medium between the capacitor plates is changed, then the density of the gaseous dielectric medium between the capacitor plates is also changed. The change in density of a gaseous dielectric medium is a function of the temperature change at a stable pressure condition and can be predicted or determined. This determination can also be done by calibration. Thus, correlation of the temperature and the density effects on a gaseous dielectric medium disposed between capacitor plates will provide a measurement of the gas pressure between the capacitor plates.

Temperature Factor

For an ideal gas at a given pressure, the density of the gas is inversely proportional to the absolute temperature of the gas. Also, since room temperature is approximately 540° R (Rankin), then a 1° F. (Fahrenheit) or 1° R variation with respect to room temperature will produce a variation in gas density of 1/540 or 0.185%. If density of gas alone were used as a measure of pressure, then the indicated pressure would vary by 0.185% for each degree Fahrenheit of temperature change with respect to room temperature. Thus, it becomes obvious that a highly accurate pressure measurement from a density measurement of a gas will also require a highly accurate temperature measurement of the gas.

With respect to the foregoing it should be noted that the temperature effects described are stated as a percent of value rather than a percent of full scale reading. Thus, a one degree °F. or °R change would affect a 15 psi pressure measurement by 0.028 psi and a 1,500 psi pressure measurement by 2.8 psi.

The problem with making a temperature measurement of a dielectric gas in a capacitor is that a temperature probe or temperature sensor is not accurate at the point or location where the gas is located between the capacitor plates. The problem of temperature measurement may be more apparent from the following example: for a room temperature of 25° C. (298° K), each degree of temperature change represents a 0.34% change (1/298° K) of absolute temperature. Then, with a constant one atmospheric pressure (15 psia), a 1° K change produces 0.05 psia change (0.34×15) in pressure. With a constant pressure of 100 atmospheres (1500 psia), a 1° K or a 1° C. change produces a 5 psia change (0.34×1500) in pressure. Thus, the temperature resolution must be less than 0.0002° K for three decimal place resolution at 1500 psia and for two decimal place resolution at 15,000 psia. This effect of temperature also requires that the temperature measurement system not have any hysteresis or nonrepeatability upon temperature recycling which would introduce errors into the measurements.

Capacity Relationship Relative To Density and Temperature

Figure 1B:
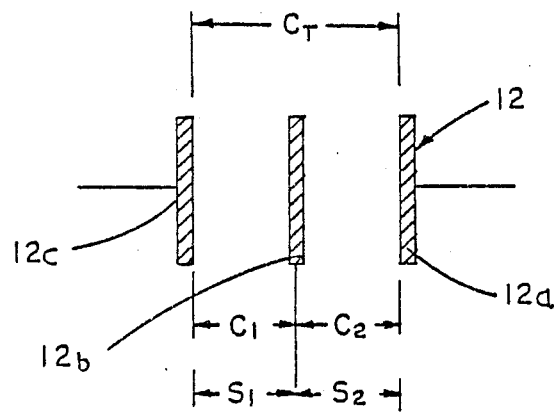
FIG. 1B is a schematic illustration of a dual capacitance device.

Referring to FIG. 1B, if a capacitor 12 has a capacitor plates 12a, 12b and 12c, where the plate 12b is a common central plate, then the total capacitance $C_T$ between the plates 12a and 12c, at a constant or stable temperature, is effectively related to the individual capacitances $C_1$ and $C_2$ as follows:

$$\frac{1}{C_T} = \frac{1}{C_1} + \frac{1}{C_2} \quad (1)$$

or $$C_T = \frac{C_1 C_2}{C_1 + C_2} \quad (2)$$

If the temperature of the capacitor 12 now changes and the capacitor plate 12b warps or flexes with respect to a central transverse axis with the change of temperature while the capacitor plates 12a, 12c remain substantially immovable, then the total capacitance $C_T$ remains constant, independent of the temperature change. The total capacitance $C_T$ is a function of the density of the dielectric gaseous medium located between the capacitor plates.

The proof of this independent relationship of the total capacitance $C_T$ to the density of the gas is as follows: The capacitance $C_1$ is defined as $$C_1 = \frac{AE}{S_1} \quad (3)$$

Where A is the area of the capacitor plate; E is the dielectric constant; and $S_1$ is the gap or spacing between the plates of the capacitor $C_1$. The capacitance $C_2$ is defined as $$C_2 = \frac{AE}{S_2} \quad (4)$$

where $S_2$ is the other gap or spacing between the plates of the capacitor $C_2$.

Restating the equation (2), $$C_T = \frac{C_1 C_2}{C_1 + C_2} \quad (5)$$

and by substituting of equations (3) & (4) into equation (5), $C_T$ is stated follows:

$$C_T = \frac{A^2 E^2}{S_1 S_2} \div AE\left(\frac{1}{S_1} + \frac{1}{S_2}\right) \quad (6)$$

and by simplifying equation (6), $C_T$ is reduced to the following statement:

$$C_T = \frac{AE}{S_1 + S_2} \quad (7)$$

Since the quantity of $(S_1 + S_2)$ is a constant value and A is a constant value, $C_T$ remains constant independent of the position of the plate 12b relative to the plates 12a and 12c.

From the foregoing, it can be appreciated that the equation (7) for $C_T$ above is a measure of gas density or dielectric value of the gas independent of the individual capacitance values $C_1$ and $C_2$.

The capacitor plate 12b is also a capacitance divider. The mathematical relationship which gives the linear relationship of a displacement of the capacitor plate 12b from a center position when the pressure is constant is $$S_0 = K_1 \frac{C_1 - C_2}{C_1 + C_2} \quad (8)$$

where $S_o$ is equal to the difference between $S_2$ and $S_1$ and is the displacement of plate 12b from a center position. $K_1$ is a proportionality constant. Equation (8) can be verified by substituting the values of $C_1$ and $C_2$ from equation (3) and (4) into equation (8).

Since the displacement $S_o$ of the center plate 12b is directly dependent upon temperature, the temperature effect is also a function of the displacement $S_o$ of the capacitor divider plate 12b. Conversely, as shown by equation (8), the temperature effect is totally independent of the gas dielectric constant E and is directly dependent on the displacement $S_o$ of the capacitor divider plate 12b due to temperature.

PRESSURE AND TEMPERATURE

The relationship of pressure and temperature in a gaseous medium is defined by the equation of state for an ideal gas that $$PV = n\gamma T \quad (9)$$

or $$\frac{PV}{nT} = \gamma \text{ (the universal gas constant)} \quad (9A)$$

Where "p" is absolute pressure; T is absolute temperature; "v" is volume and "n" is the number of moles of gas.

Since v/n, the volume per mole of the gas, is equivalent to the reciprocal of density "d" of the gas, then the gas law (9) can be stated in another form:

$$P = K_2 T d \quad (10)$$

where "p" is in absolute pressure and "T" is in absolute temperature and $K_2$ is a proportionality constant.

The dielectric constant "E" is related to the density d of a gas by the Clausius-Mosotti equation $$\text{AlPha}(M) = \frac{M}{d} \frac{(E - 1)}{(E + 2)} \quad (11)$$

where "alpha(m)" is the molecular polarizability and "m" is the molecular weight of the gas. Alpha(m) can be made constant with temperature by proper selection of the gas and where "m" is constant, the relationship can be stated $$\frac{(E - 1)}{(E + 2)} = K_3 d \quad (12)$$

where the $K_3$ is a proportionality constant and where alpha(m) and "m" remains constant.

Therefore, the pressure of a dielectric gas and the temperature of a dielectric gas are related to the dielectric constant "E" (by use of equations 10 and 12) as follows $$P = \frac{K_2 T(E - 1)}{K_3(E + 2)} \quad (13)$$

Pressure "p" is thus a dependent function of temperature T and the dielectric constant E.

Gas Volume Change

One of the major difficulties in utilizing a gas for measurement of pressure is that a gas is highly compressible and there is a large volume change of gas associated with changes in pressure. For example, the volume of an ideal gas at 15,000 psi is one thousand times smaller than its volume at atmospheric pressure (same temperature). If a gas is separated from a pressure media (a liquid, for example) by a movable isolation diaphragm, then the isolation diaphragm must be displaced or move sufficiently to produce a thousand to one volume change in the gas for a pressure gauge with a pressure measurement range of 15 psia to 15,000 psia.

One method of reducing the displacement factor of a movable isolation diaphragm for measurement of gas pressure is to reduce the internal volume containing the gas pressure sensor to as nearly zero as possible for the fully deflected position of the isolation diaphragm. A piston, for example, with a stroke of one inch would end up with its initial gas volume compressed into 0.001 inches for a thousand to one volume reduction. Real gases, however, typically become less compressible as pressure increases. At 15,000 psi, for example, nitrogen occupies about 2.283 times the volume that it would occupy if it behaved as an ideal gas. This means that the 1000/1 volume change required for 15,000 psi is now reduced to 438/1. This effect is defined more accurately by the Van Der Waals equation for non ideal gases. In the present invention, the gas volume in the sensor is minimized or reduced to very small volumes so that volume changes are minimized.

Dielectric Constant

The dielectric constant E of a substance is expressed as the ratio of an electrical capacitance value utilizing the dielectric substance to an equivalent electrical capacitance value for the dielectric substance of a vacuum. Considering the dielectric constant for air as 1.00059 under atmospheric conditions, then the total effect of the presence of air over the presence of a vacuum is 0.00059 out of 1.00059. For 15,000 psia, the new value for the dielectric constant of air would be 1.734 (see equation 11). The actual value is somewhat lower because of the reduced compressibility effect at high pressures as described above for nitrogen. High sensitivity in a capacitor thus requires the use of a gas dielectric medium with as high a dielectric constant as possible. Gases with high dielectric constants, however, also tend to have high critical temperatures and dipolar polarizibilities. The critical temperature is the temperature above which a gas cannot exist as a liquid regardless of pressure. In the present invention the critical temperature of the gas utilized should be below or less than the lowest expected operating temperature. Thus, a low critical temperature will preclude the possibility of the dielectric gas liquefying under normal pressure temperature conditions encountered in the operating range of the pressure sensor.

The molecular polarizibility "alpha(m)" of a gas is made up of several components, however only one of them, the dipolar polarizibility, is of particular relevance for the frequency range of the present invention. The molecular dipolar polarizability factor will introduce a temperature dependency into the dielectric value for a gas. Although this temperature dependence is predictable and repeatable, it adds to the temperature effect which must be corrected. For this reason it is desirable to chose substances that have little or no dipolar polarizability.

The highest dielectric constant for noble gases suitable for high pressure measurement is krypton followed by nitrogen. Of the organic gases, methane and carbon tetraflouride have a suitable critical temperature, no dipolar polarizibility and a dielectric constant greater than nitrogen. Of the inorganic gases silicon tetrafluoride and sulfur hexafluoride meet these requirements. Fortunately, the dielectric constant of a gas generally increases slightly more than expected for high pressures.

The dielectric constant for methane, at 0° C., is 1.000944. At 15,000 psi, it should be about 2.377 for a capacitance modulation of 238% of that at atmospheric pressure (ignoring the non-linear compressibility effect at high pressure). This is sufficient for six digit resolution for a full scale as low as five thousand psia without noise problems from the electronics. This lower pressure range can be further reduced by the use of the inorganic gases. Silicon tetrafluoride has a dielectric constant of 1.00198 and sulfur hexafluoride is 1.00288 at atmospheric pressure.

Figure 1C:
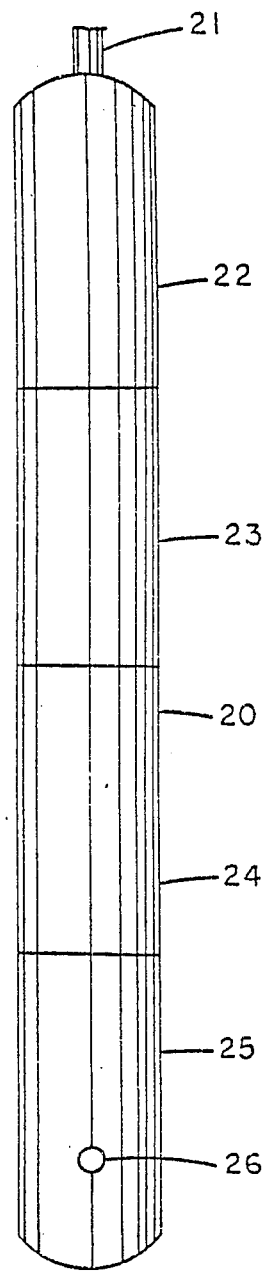
FIG. 1C is a schematic illustration of a well tool which can utilize the present invention.

As shown in FIG. 1C, in one application of the present invention, a downhole tool 20 is sized for insertion through a small diameter well tubing on the end of a wire line cable 21. The tool 20 generally would include a battery pack 22 as a source of power, an electronics section 23 for electrically processing data and for power to the instrumentation, a temperature sensor section 24 for sensing temperature and a pressure sensor section 25 for sensing pressure. An opening 26 admits fluid under pressure to the pressure sensor in the sensor section 25.

Figure 2:
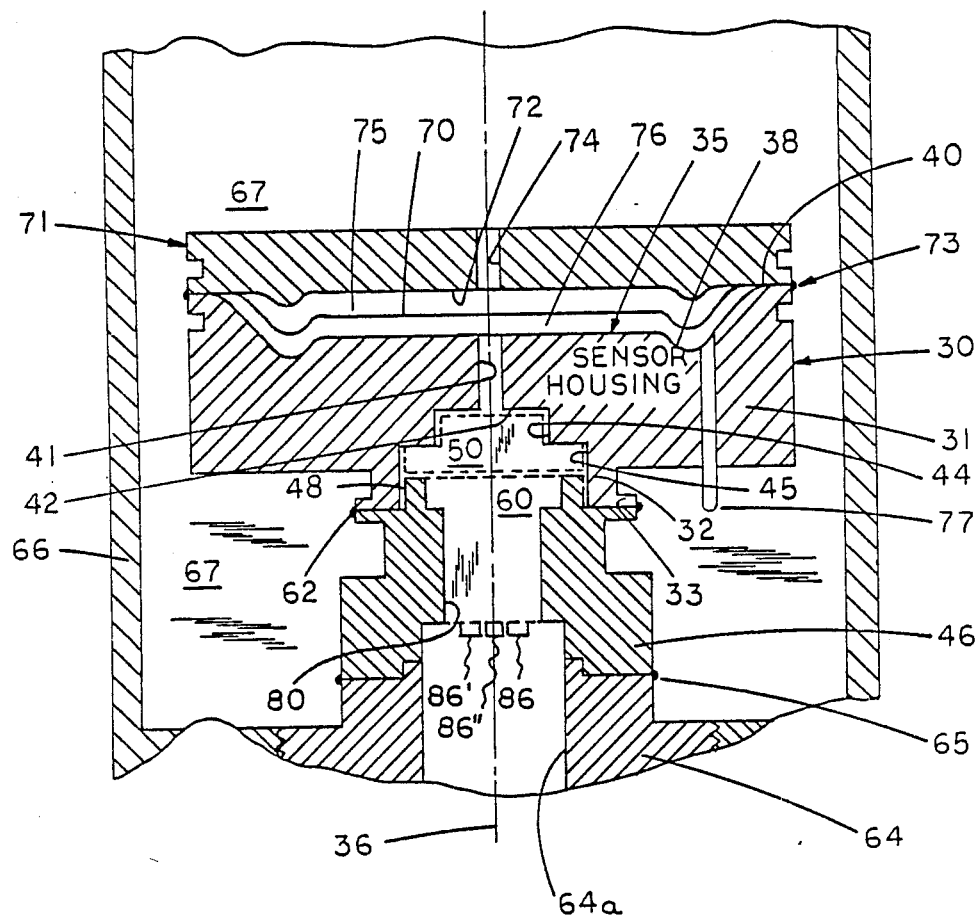
FIG. 2 is a partial view in cross-section through the center line of a housing construction for the present invention.

Referring now to FIG. 2, the present invention is schematically illustrated with its basic organization where a cylindrically shaped sensor housing 30 is constructed from stainless steel. The housing 30 has a housing base 31 and a lower central portion 32 of smaller diameter with a flange 33. The housing base 31 has an upper, annular flat central face 35 and a lower end flange 33. The lower flange 33 and the upper face 35 are coaxial and disposed radially transverse of the central axis 36 of the housing 30. About the central axis 36 on the upper central face 35 is an annular, curvilinear recess 38 which extends between the central face 35 and an outer annular and flat sealing face 40. The central face 35 is connected to a sensor cavity or chamber 42 by a centrally located, small diameter opening 41. The sensor cavity 42 is an enclosure defined by diametrically stepped bores 44, 45 and contains a pressure sensor unit 50 (shown in dashed line). A cylindrical base 48 of a bulkhead connector 60 which supports the sensor unit 50 is shown in dashed lines. The bulkhead connector 60 is sealed in a central axial bore formed in a tubular coupling member 46 which is made of stainless steel. A flange on the upper end of coupling member 46 abuts the flange 33 on the base 31 and the two flanges are attached and joined to one another by an annular electron beam weld 62. The connector 60 serves the function of seating and centering the sensor unit 50 in the cavity 42 and providing electrical outputs for the sensor unit 50. Base 31 and coupling member 46 are joined by the beam weld 62 so that a fluid tight seal is formed therebetween.

Disposed across the upper face 35 of the housing base 31 and supported on the annular sealing face 40 in spaced relation to face 35 is a thin metal diaphragm 70 (of stainless steel) which is shaped similar to the shape of the face 35 and the recess 38 to approximately complement the configuration of the upper face 35 and the recess 38. A cylindrical housing cap member 71 is provided with an inner surface 72 shaped similar to the diaphragm 70 to approximately complement the facing surface of the diaphragm 70, although spaced therefrom to define an interior space 75. The cap member 71 is attached by an electron beam weld 73 to the housing base 31 and fuses the peripheral portion of the diaphragm 70 with the annular surface 40 to thereby establish a fluid tight seal.

A central port 74 in the housing cap member 71 couples a pressure medium exterior to the housing cap member 71 to the interior space 75 between the housing cap 71 and the diaphragm 70. The interior space 76 between the diaphragm 70 and the face 35 of the housing base 31 are connected by a port or passageway to a pinch tube 77. In practice, the pinch tube 77 is utilized for filling the interior of the housing space 76 with a sensor dielectric gas at a specific reference pressure. The pressure to be sampled is transmitted to the diaphragm 70 via fluid in the port 74. The coupling member 46 is attached to one end of a tubular threaded member 64 in coaxial relation therewith by an electron beam weld 65. Thus, the entire assembly of the cap member 71, the housing base 31, the coupling member 46 and threaded member 64 are interconnected into a single sensor assembly 30. The sensor assembly 30 is threadedly and sealingly coupled to a tubular tool body 66 by threaded connection of the tubular threaded member 64 with tool body 66 and electrical leads from the sensor unit 50 can be passed through the bore 64a of tubular threaded member 64 to an electrical cartridge assembly (not shown). The interior of tool body 66 is provided with an oil or other pressure media 67 which completely immerses the assembly 30 so that there is an equally applied pressure on the entire outer surface of the assembly 30 and the coupling member 46. This immersion of the assembly 30 balances the pressure inside and outside of the unit thereby eliminating distortion due to pressure stresses.

Figure 3:
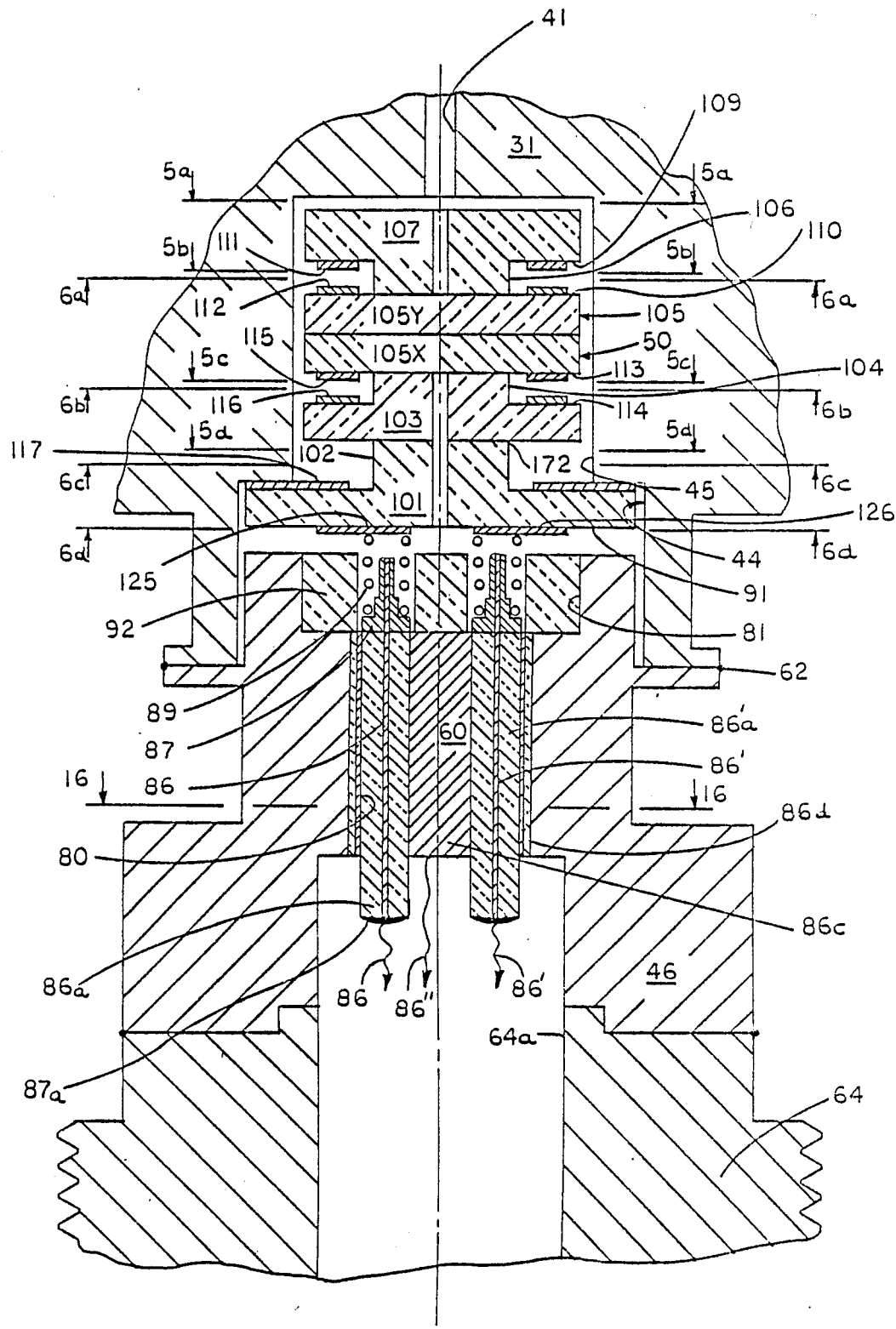
FIG. 3 is a partial view in enlarged cross-section of a sensor construction illustrated in dashed line in FIG. 2.

Referring now to FIG. 3 and FIG. 16, the bulkhead connector 60 is a cylindrical member which is sealingly disposed in a central bore 80 of the coupling member 46 where the bore 80 has a counter bore 81 at one end (FIG. 3). Disposed in the bore 80 are a pair of electrical metal wire leads 86, 86' with ceramic electrical insulating sheaths 86a, 86a'. The ceramic sheaths 86a, 86a', in turn, are embedded within a cylindrical metal housing member 86c. The member 86c is sealed in the bore 80 by a tubular ceramic sheath 86d. The housing member 86c extends between the counterbore 81 and the other end of the bore 80, and is electrically insulated from the tubular coupling member 46 by the ceramic sheath 86d. This construction permits the capacitance affects between the wire leads 86, 86' and the housing to be neutralized electrically in a well known manner.

Figure 4:
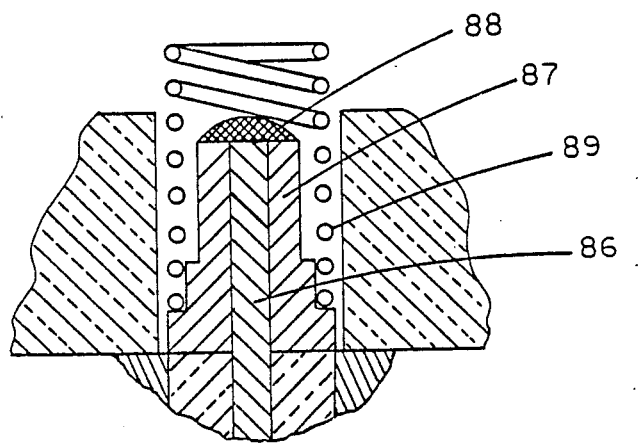
FIG. 4 is a partial view in enlarged cross-section of a contactor shown FIG. 3.

At an inner terminal end of the sheath 86a, the wire lead 86 is attached to a tubular brass contact 87 by a solder connection 88 (see FIG. 4). A coil spring 89 is disposed over and in contact with the brass contact 87 so that when the coupling member 46 is electron bonded (at 62) to the housing base 31, the coil spring 89 provides independent electrical contact with a metal film contact surface 125 deposited on an end surface 91 of the sensor unit 50. At the other end of the wire 86 is a solder connection 87a for attachment of an output wire. Thus, there is an electrical path from the contact surface 125 through the spring 89, the contact 87, the solder connection 87a to the wire lead 86. The other wire lead 86' is similarly connected by a similar construction to a second contact surface 126 deposited on the end surface 91 of sensor unit 50. An electrical guard wire 86" is also connected to the metal subhousing 86c. A ceramic, cylindrically shaped filler block 92 with openings for alignment with the spring members 89 fits snugly in the counter bore 81 and contains the springs 89. The sensor unit 50 is pressed into contact with the housing base 31 by the contact springs 89 and makes an electrical ground connection with the housing base 31 by means of an annular metallized film 117 located on an upper annular surface of the sensor unit 50 which engages the annular shoulder formed by the counter bore 44.

The sensor unit 50, as shown in vertical cross section in FIG. 3 is preferably constructed from glass ceramic materials which will hereafter be more fully described. The sensor unit 50 includes a circularly shaped base support member 101 with a circularly shaped, centrally located base support member pedestal or post portion 102. The pedestal portion 102 is smaller in diameter than the support member 101. Bonded to the base support member pedestal portion 102 is a circularly shaped lower capacitor support member 103 with a centrally located, circularly shaped, lower base support member portion 104. The pedestal portion 104 is smaller in diameter than the support member 103. The support member 103 is smaller in diameter than the support member 101 and sized to fit within the bore 45. Bonded to the lower pedestal portion 104 is a circularly shaped composite disc member 105 formed from two circularly shaped disc elements 105X and 105Y which are bonded to one another. The disc member 105 is the same diameter as the support member 103. Bonded to the composite disc 105 is a circularly shaped, pedestal or post portion 106 of an upper circularly shaped capacitor support member 107. The diameter of the support member 107 is the same as the diameter of the composite member 105. The diameter of the pedestal portion 106 is the same as the diameter of the pedestal portion 104. As will be described hereafter, the members 101, 103, 105 and 107 are all constructed from the same material.

On annular facing surfaces 109, 110 of support member 107 and disc member 105, respectively, are facing thin metal annular films 111, 112 which define a first capacitance. On facing surfaces 113, 114 are facing thin metal annular films 115, 116 which define a second capacitance.

FIGS. 5(A-D) illustrate the top surfaces respectively of the upper capacitor support member 107, the composite disc 105, the lower capacitor support member 103 and the base support member 101. As shown in FIGS. 5A, 5B and 5C, the members 107, 105, 103, respectively, have peripheral arcuate (substantially semicircular) indentations 107(a,b,c), 105(A,B,C) and 103(A,B,C) where the indentations in each member are equiangularly spaced at 120° from one another. Each of the indentations is lined with a gold thick film for electrical attachment purposes.

On the surface 110 of disc 105 (FIG. 5B), the thin metal annular film 112 is arranged with an inner circumference to encircle but be spaced from the pedestal portion 106 and the outer circumference of the film 112 is arcuately indented adjacent each of the semi-circular indentations 105B and 105C so as to be spaced therefrom but is in contact with the circular edge (and the thick film 105D) of the indentation 105A.

On the surface 114 of support member 103 (FIG. 5C), the thin metal annular film 116 is arranged with an inner surface to encircle but be spaced from the pedestal portion 104 and the outer circumference of the film 116 is arcuately indented adjacent each of the semi-circular indentations 103A and 103C so as to be spaced therefrom but is in contact with the thick gold film 103D at the circular edge of the indentation 103B.

In FIG. 5D, the top surface of the base support member 101 is metallized to provide the annular thin metal annular film 117 on its surface arranged with an inner circumference of the film 117 to encircle but be spaced from the pedestal portion 102. The metal film 117 contacts a thick metal film 101D in the opening 101B but is circularly spaced from the openings 101A, 101C to completely clear and not touch the two openings 101A and 101C nor the thick films provided therein.

FIGS. 6(A-D) illustrate the bottom surfaces respectively of the upper capacitor support member 107, the composite disc 105, the lower capacitor support member 103 and the base support member 101. On the annular surface 109, the thin metal annular film 111 is in an annular form with a central circumference arranged to encircle but be spaced from the pedestal portion 106 and its outer circumference is arcuately indented at each of the indentations 107C and 107A so as to be spaced therefrom but contacts the thick metal film 107D at the circular edge of the indentation 107B.

On the surface 113 of composite disc 105 (FIG. 6B), the thin metal annular film 115 is in an annular form with a central circumference arranged to encircle but be spaced from the pedestal portion 104 and its outer circumferences is arcuately indented at each of the semi-circular indentations 105A and 105B so as to be spaced therefrom but contacts the thick metal film 105D at the circular edge of the indentation 105C.

On the bottom surface of the base support member 101 are separate, centrally disposed thin metal films 125, 126 which respectively contact the thick films 101H, 101G at the respective edges of openings 101C and 101A in the base member 101. As shown in FIG. 5D, the openings 101(A-C) in the base member 101 are equiangularly spaced from one another. The indentations 107(A-C), 105(A-C) and 103(A-C) align with one another and with the openings 107(A-C). That is, the indentations 107A, 105A, 103A are in vertical alignment with one another and with the opening 101A as are the other sets of openings and indentations.

Referring briefly back to FIG. 3, the circular base of the base support member 101 has a slight annular spacing or gap relative to the wall of counterbore 44 in the housing 30. There is a larger gap or annular spacing between the sensor unit assembly 50 and the circular bore enclosure 45 so that base member 101 insures the spacing of assembly 50 from the cavity wall. The annular spacing with respect to the base 101 and wall of bore 44 is such that housing 30 can contract without applying undue stress on the base 101.

Figure 7:
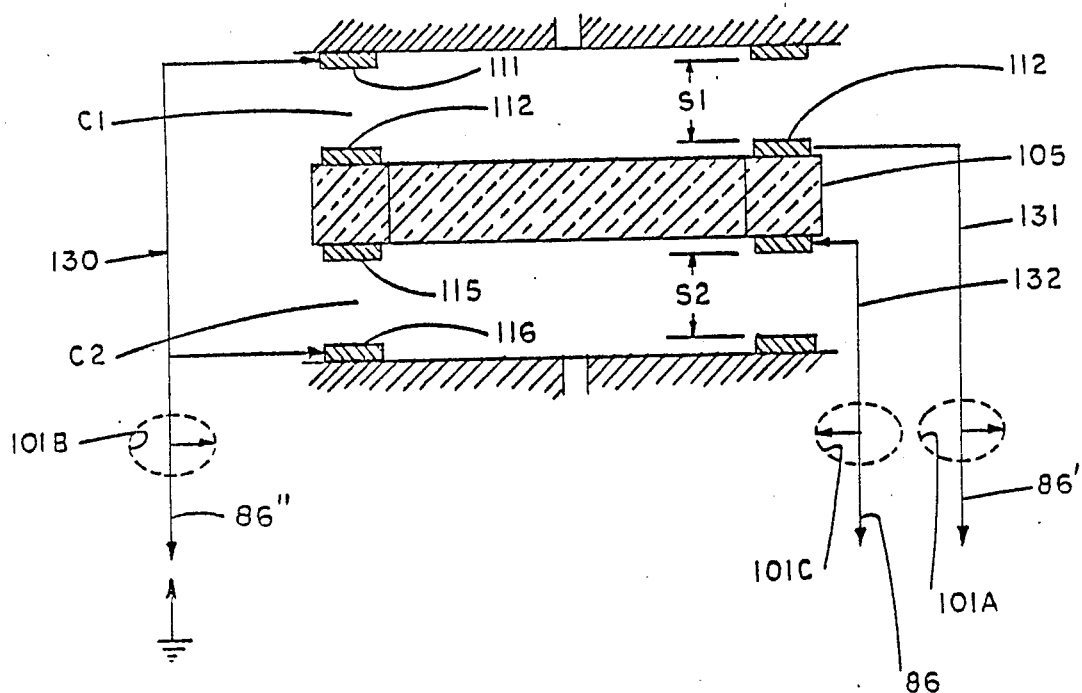
FIG. 7 is a schematic representation for illustration of certain principles of the present invention.
Figures 8, 9, 10:
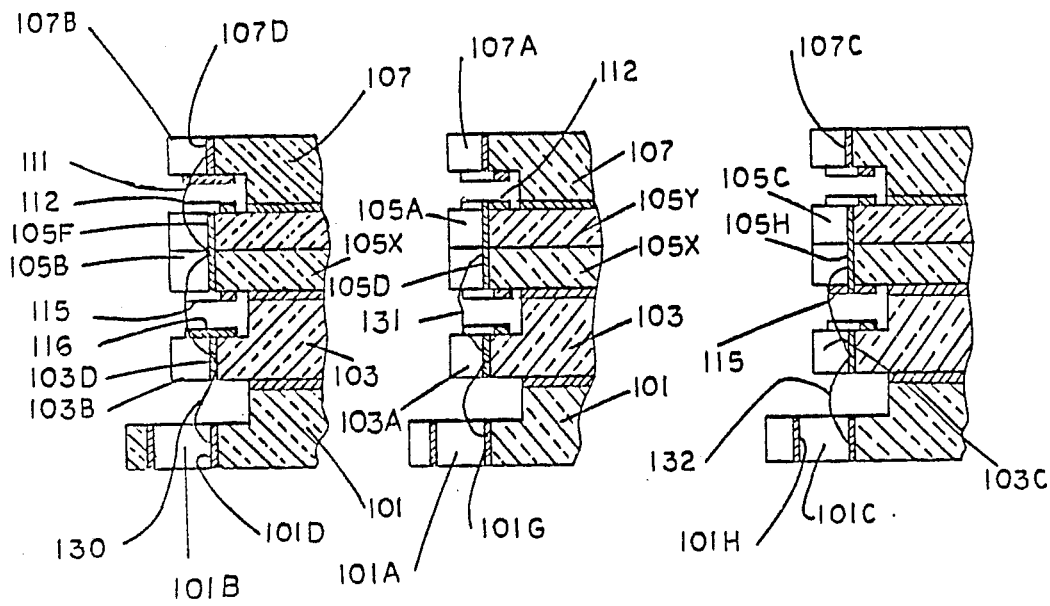
FIG. 8 is a partial view in cross-section taken along line 8—8 of FIG. 5D.
FIG. 9 is a partial view in cross-section taken along line 9—9 of FIG. 5D.
FIG. 10 is a partial view in cross-section taken along line 10—10 of FIG. 5D.

A vertical cross-section of a portion of sensor unit 50 is shown in FIG. 8 which extends through the indentations 107B, 105B, 103B and the opening 101B. Each of these indentations and the opening 101B are coated with a thick metal film 107D, 105F, 103D and 101D respectively. The thick metal film 107D in the indentation 107B makes electrical contact with the thin film 111 on member 107 at the indentation 107B (see FIG. 6A). The thick metal film 103D in the indentation 103B makes electrical contact with the thin metal film 116 on the member 103 at the indentation 103B (see FIG. 5C). A thick metal film 105F is coated into the indentation 105B. A silver or platinum wire 130 (see FIG. 8) of micro dimensions is electrically connected to each of the thick metal films and disposed in the indentations 107B, 105B, 103B and to the opening 101B. Thus, the thin films 111, 116 and 117 are connected to a common electrical reference point which will be an electrical ground. As schematically shown in FIG. 7, the films 111 and 116 form capacitance plates.

A vertical cross-section of another portion of sensor unit 50 is shown in FIG. 9 which extends through the indentations 107A, 105A, 103A and the opening 101A. The indentation 105A and the opening 101A are coated with a thick metal film 105D and 101G respectively. The thick metal film 105D makes electrical contact with the thin film 112 on the member 105 at the indentation 105A (see FIG. 5B). A silver wire 131 of micro dimensions is attached to the thick metal films in the indentation 105A and the opening 101A. Thus, the film 112 is connected to the thick film 101G in opening 101A. As schematically shown in FIG. 7, the film 112 forms a capacitor with the film 111.

A vertical cross-section of a portion of sensor unit 50 is shown in FIG. 10 which extends through the indentations 107C, 105C, 103C and the opening 101C. The indentation 105C and the opening 101C are coated with a thick metal film 105H and 101H respectively. The thick metal film 105H makes electrical contact with the thin film 115 on the disc member 105 at the indentation 105C (see FIG. 6B). A silver wire 132 of micro dimensions is attached to the thick metal film in the indentation 105C and the opening 101C. Thus, the film 116 is connected to the thick film 101H in opening 101C. As schematically shown in FIG. 7, the film 115 forms a capacitor with the film 116.

Referring now to FIG. 7, the arrangement of thin film 111, 112, 115, 116 are schematically illustrated to show the films 111, 112 defining a capacitor $C_1$, and the films 115, 116 defining a capacitor $C_2$ where the films 112, 115 are supported on a common member 105. The outer capacitor plates 111 and 116 are held constant and immovable with respect to one another. The capacitor plates 112, 115 are spaced a distance $S_1$ and $S_2$ respectively from the capacitor plates 111, 116. The common member 105 flexes predictably in response to temperature. The capacitance measurements of capacitors $C_1$ and $C_2$ can then be correlated to temperature by the displacement relationship of equation (8) and to the common dielectric constant of the gaseous medium by the capacitance relationship of equation (2) where the change in value in the gaseous dielectric medium is a function of a pressure to be measured.

In the present invention the capacitance spacing gaps $S_1$ and $S_2$ are chosen to be $0.2 \times 10^{-3}$ inches or less to keep internal volume very small and also to allow a small structure while still providing good capacitance values to work with. The small spacing gap values also provide a high sensitivity to the displacement of the temperature sensing composite member 105 so that the required stresses for deflection can be minimized. The thin layers of gas in the capacitance spacing gaps $S_1$, $S_2$ result in a very fast response time for temperature so that the gas in the spacing gaps quickly assumes the temperature of the body of the sensor. Thus, there are no significant temperature gradient effects. In this way, the integral temperature measurement of the sensor provides an accurate temperature measurement of the actual gas sample whose density is being measured by its dielectric constant.

The composite disc 105 is constructed from two discs of the same material (as discussed hereafter) but where one disc has a different temperature coefficient of expansion than the other. The two discs are bonded or joined to one another at a bonding temperature significantly above the upper operating temperature value. A change in temperature causes the composite disc 105 to function similar to a bi-metallic construction and produce a micro flexure about the central axis 36. Since the peripheral edge of the composite disc 105 is unconstrained, the disc 105 can flex easily in response to temperature because of the different temperature coefficient of expansion for its composite materials. Thus the composite disc 105 is a temperature sensitive member which will respond to temperature change to vary the spacing gaps between the two capacitors and the respective value of their ratio. By use of the formula (8) the displacement $S_o$ can be determined where $S_o$ is a function of temperature.

Figure 11:
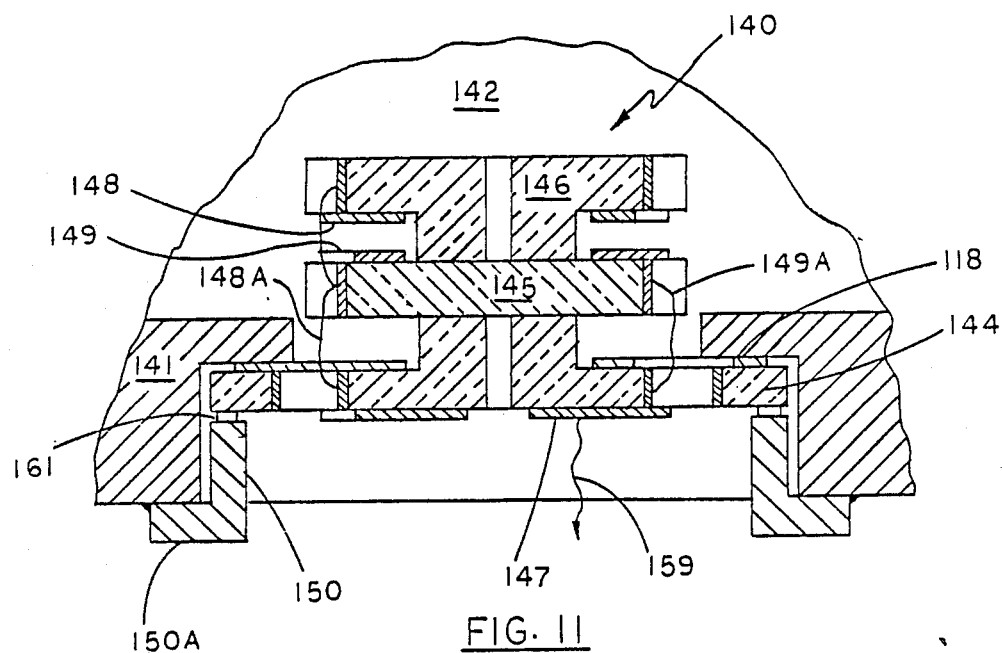
FIG. 11 is a view in partial cross-section of a reference transducer.

In electrical processing of capacitance values, the electronic circuitry inherently develops a coefficient error factor in the processed data values. This inherent coefficient error factor is eliminated in the following manner. A vacuum reference sensor unit 140 is provided in the tool body (see FIG. 11). The sensor unit 140 is mounted in a transverse bulkhead 141 in the tool housing 66 (FIG. 2) and in an evacuated chamber 142 so there is no gas or dielectric medium to be temperature sensitive. The reference sensor unit 140 is constructed with a base pedestal member 144, a disc shaped member 145 and a pedestal member 146 constructed from glass ceramic materials as described herein. Capacitor metal films 148, 149 deposited on opposed facing surfaces of members 145 and 146 define a reference capacitor. The sensor unit 140 is secured in the bulkhead 141 by the pedestal member 144 engaging a shoulder surface in the bulkhead 141 and an annular metal ring 150 which clampingly engages the pedestal member 144. The ring 150 has a radial flange 150A which is tack welded to the bulkhead 141. An annular wavy spring 161 is interposed between the ring 150 and the pedestal member 144 to provide the proper pressure for electrical contact between a metal film 118 and the bulkhead 141. No composite disc 105 is required because no temperature effect is encountered in the vacuum. Temperature effects on the sensor reference capacitance can be corrected from the temperature data of the other sensor 50. The construction technique for electrically connecting the plates 148, 149 to an output is by indentations, wire and film as described with respect to the sensor unit 50. As schematically shown in FIG. 11, the metal film 148 is connected by a thin wire 148A to a metal film 118 as an electrical ground. The metal film 149 is connected by a thin wire 149A to metal film 147 and output lead 159.

Figure 12:
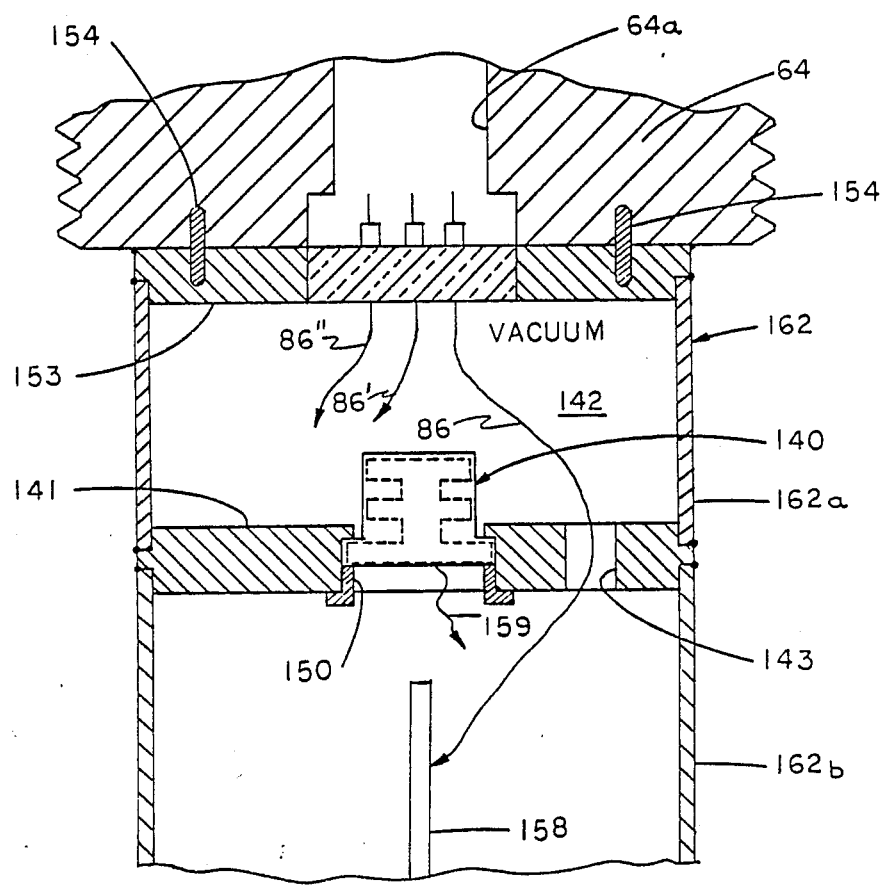
FIG. 12 is a schematic view in cross-section of mounting of the reference transducer of FIG. 11.

As shown in FIG. 12 the transverse bulkhead 141 is attached to the inner wall of a tubular support means 162 which has upper and lower parts 162a, 162b respectively. The upper part 162a is sealingly attached at one end to a transverse base member 153 which has alignment pins 154 received in alignment sockets in the end surface of the threaded coupling 64. The base member 153 has electrical feed through connections for plug-in connection to the pressure sensor 50 and the electrical wires 86, 86' and electrical guard wire 86" representing connections to the various capacitor plates 112, 115 and guard. The wire 159 from the reference sensor unit 140 is also coupled to the electrical circuit board assembly 158 mounted inside the lower part 162b of tubular support 162. The other side is connected to the housing. The lower end of the housing part 162b is sealed to enclose the electronics board assembly 158 and the sensor unit 140 and permit a vacuum condition to be obtained within the support means 162.

Figure 13:
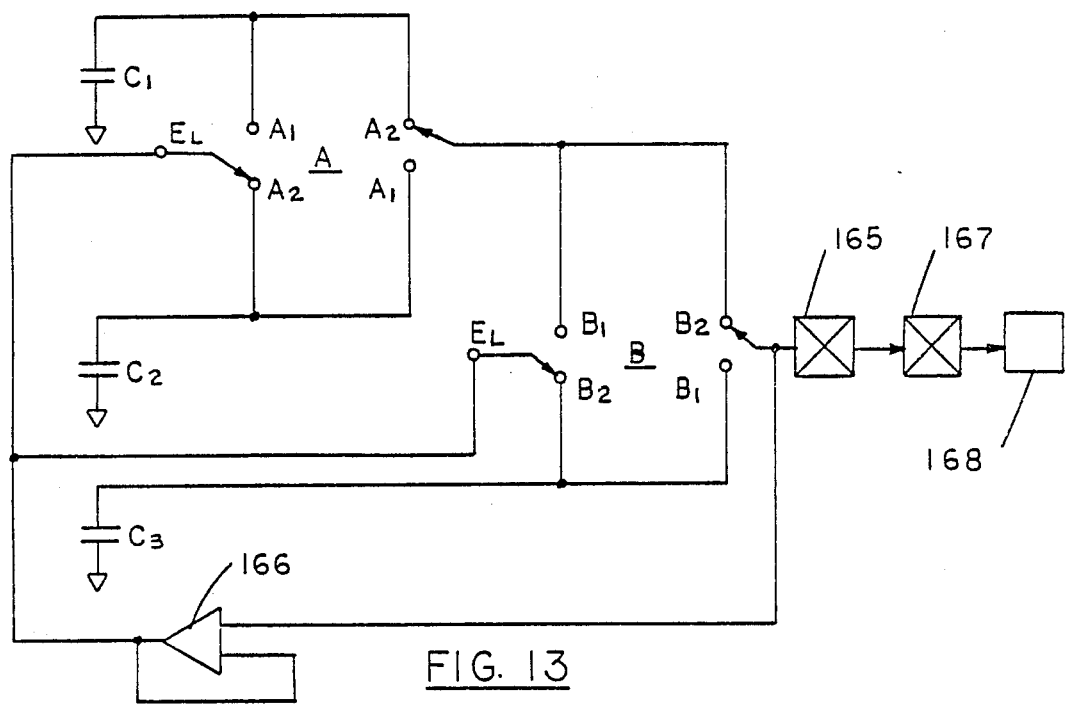
FIG. 13 is an electrical schematic for use with the present invention.

Referring now to FIG. 13, circuitry for processing data is schematically illustrated. In respect to processing of data, the capacitance values of the capacitors $C_1$, $C_2$ and $C_3$ (the reference sensor 140) can be processed through a single channel processor means 165 as shown in FIG. 13. A single channel processor means 165 is illustrated in detail in U.S. Pat. No. 4,091,683 for two capacitors and its application to this invention will be apparent. In FIG. 13, three capacitors $C_1$, $C_2$ and $C_3$ are illustrated with double pole, double pole switches A and B for providing a logic system to sequentially sample the capacitances of the capacitors $C_1$, $C_2$ and $C_3$. In the position shown, capacitor $C_1$ is connected by switch poles A2, B2 to the processor means 165 so that the processor provides a related output frequency signal $f_1$ while $C_1$ is connected to the processor means 165. Switch A is next operated to disconnect the capacitor $C_1$ from the processor means 165 and connect the capacitor $C_2$ to the processor means 165 to produce a related output frequency $f_2$. Next, the switch B is operated to connect the capacitor $C_3$ to the processor means 165 to produce a frequency signal $f_3$ and to disconnect the capacitor $C_2$. Switches A and B are next operated to resequence the sampling of the capacitors. To eliminate the stray capacitance effects between the plates 112 and 115, a unity gain amplifier 166 is coupled between the input to the processor means 165 and an EL pole on the switches A and B. This also provides the guard drive for 86". (FIG. 3)

The output signals $f_1$, $f_2$, and $f_3$ for the respective capacitance values of the capacitors $C_1$, $C_2$, and $C_3$ all include a conversion coefficient $K_o$ introduced by the electronic circuits. Since this coefficient is very nearly the same for each capacitance measurement of $C_1$, $C_2$ or $C_3$, then the output result of the electronics circuits can be made independent of the effects of the electronic circuits by cancellation of the effect of the coefficient $K_o$.

The relationship of the temperature of the composite disc 105 and the temperature of a dielectric gas $T_1$ is:

$$T_1 = T_0 - K_2 \left[ \frac{K_0 C_1 - K_0 C_2}{K_0 C_1 + K_0 C_2} \right] \quad (14)$$

Where $T_o$ is the temperature of bonding of the disc parts 105X, 105Y, $K_o$ is the electronics coefficient and $K_2$ is also a proportionate coefficient, and $T_1$ is the temperature of the gas. Thus $K_o$ cancels and the temperature measurement $T_1$ is shown to be independent of the coefficient $K_o$.

The derivation of pressure of the dielectric gaseous media is slightly more involved. The dielectric constant $E'$ of the gaseous media is first determined by the following relationship:

$$K_4 E' = \frac{(K_0 C_1)(K_0 C_2)}{K_0 C_1 + K_0 C_2} \quad (15)$$

or $$K_4 E' = \frac{K_0 C_1 C_2}{C_1 + C_2} \quad (16)$$

Also for the reference sensor 140

$$K_5 E_0' = K_0 C_3 \quad (17)$$

Since $E_o'$ is the dielectric constant of a vacuum and must always be equal to 1, then the equation (16) can be divided by the equation 17 to eliminate $K_o$. The result is stated as follows:

$$\frac{K_0 C_1 C_2}{C_1 + C_2} \div K_0 C_3 = \frac{K_4}{K_5} E' \quad (18)$$

or $$\frac{K_4}{K_5} E' = \frac{C_1 C_2}{C_3(C_1 + C_2)} \quad (19)$$

the value of $K_4/K_5$ can be determined by calibration of the sensor to known pressure values for a known gas so that $E'$ can be directly determined from the measurement of $C_1$, $C_2$, and $C_3$. The density of the gas can now be derived by using equation 12:

$$K_2 d = \frac{E' - 1}{E' + 2} \quad (20)$$

It is to be understood that in all equations the proportionality constant (generally indicated by "K") can be a complex function and is not necessarily a simple linear coefficient. This can occur because of deviations of actual physical parameters from theoretical values. These functions are derived from actual calibration of the device.

The processor 165 output frequency signal $f_1$, $f_2$ or $f_3$ are converted to digital numbers representative of the values of $C_1$, $C_2$ and $C_3$. The digital numbers are, in turn, processed by a computer microprocessor to develop the pressure measurement.

The density "d" from equation (20) and the temperature "T" from equation (14) can then be input into the relation set forth in equation (10) for obtaining a pressure value for pressures low enough within the validity the ideal gas equation. For pressures ranging above the validity of the ideal gas equation (10) then the Van der Waal's relationship would be utilized with the correcting known gas coefficients.

In use of the present invention, the housing 30 (see FIG. 2) is disposed in an oil filled chamber in a well tool 20 or other type of measurement housing (see FIG. 1C). Pressure to be measured is transmitted through the oil or liquid 67 on the exterior of the housing 30 and to one side of the isolation diaphragm 70 in the housing 30 (see FIG. 2). The other side of the diaphragm 70 is in contact with a dielectric gas in the space 76 at a reference pressure where the gas has access through the port 41 to the internal capacitor sensor unit 50. The sensor unit 50 is an integrally formed unit which has a small gas volume because of a small space between the end surface of the member 107 (see FIG. 3) and a small annular clearance space about the periphery of the unit 50. The unit 50 abuts a stepped shoulder between the bores 45 and 44 and is centered in the bore 45 by the close fit of the base 101 in the bore 44. The unit 50 is held in fixed position by pressure applied from the coupling 46 by the springs 89. The annular space about the member 101 and the bore 44 is a close fit to center the pedestals 103, 105, 107 in the bore 45. The thickness of thin contact films 125, 126 on the lower surface of base support member 101 is measured in angstroms and the coupling 46, the connector 60 and the sensor unit 50 are located in a fixed position in the housing 30 by the weld 62. The thin films 111, 116 are connected by the microwire 130 (See FIG. 8–FIG. 10) to the film 117 and are at an electrical ground. The films 112 and 115 are connected by the microwires 131, 132 to the films 125, 126 and through the conductors 86 and 86' to electrical circuitry in respective order. The volume in the space 76 is quite small and the isolation diaphragm 70 can bottom out on the face 35 if an overpressure is encountered.

Referring back to FIG. 3, by way of specification, the thickness of the various elements (101,102)(103,104) (105X,105Y) and (106,107) is equal and at 0.040 inches. All three thickness dimensions are chosen to be equal so that the effects of gravity and vibration will be the same on each disc. The diameter of a pedestal base member 103, for example, is 0.350 inches while the diameter of the base member 101 is 0.500 inches. The thickness of the base member 101 is 0.050 inches. The gap spacing dimension between the thin metal films 115,116 and 111,112 is 200 micro inches.

To make a pedestal unit, a cylindrical disc member of the type of material described herein is provided with a surface layer of photo resist material and through photo lithography, a center disc is defined to be protected from etching. By using an acid bath wash, the circumference is etched to provide an accurate vertical gap dimension with a central circular post. When a pedestal is formed it is next attached to an adjoining part by coating the surfaces to be joined and electrostatic bonding one part to another as explained hereafter.

Sensor Construction

Figure 14:
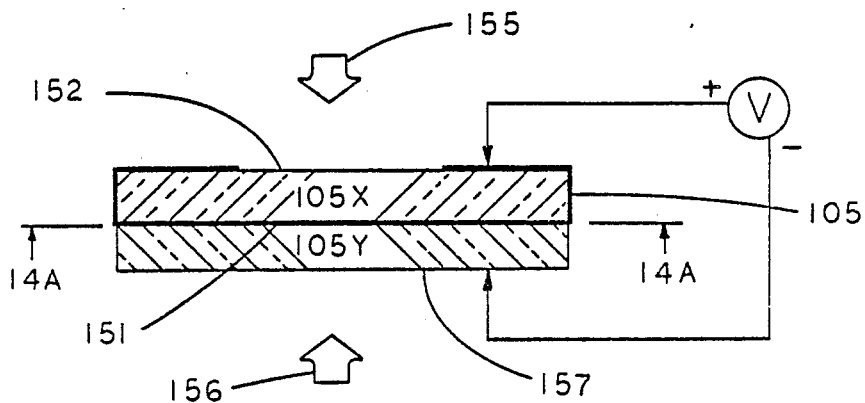
FIG. 14 is a schematic representation of a step in the process involved in the present invention.

Certain glass ceramics, of which ZERODUR, a commercially available material (manufactured by Schott Glass) is one, have the unique characteristic that their thermal coefficient of expansion can be changed by heat treatment. The composition of such materials is partially crystalline with the remainder being amorphous. These two phases have different temperature coefficients of expansion so that the overall coefficient of expansion can be adjusted by varying the ratio of the structure in a unit volume. In the case of ZERODUR, the coefficient of expansion is adjusted to zero. By proper heat treatment of the material, the coefficient of expansion can be made predictably different from the standard near zero value. Thus, in making the center composite part 105, the ZERODUR material for one of the composite disc parts 105X is heat processed to provide a different coefficient of temperature expansion by a defined amount while the other disc 105Y is unchanged and at close to zero. With reference to FIG. 14 as illustrated, to join the two discs to one another, the contact surface of a disc element 105X is first coated by sputtering a film layer of tantalum 2500 Angstroms thick on the lower contact surface 151, the circular side edges and an annular portion of the opposite surface 152. As shown in FIG. 14A, clearance of the film layer is provided around each edge or peripheral indentation 105(A-C) so that electrical shorting cannot take place between the indentations intermediate of the disc elements 105X and 105Y. A second layer of silicon is then sputtered on the layer of tantalum and is 5000 Angstroms thick. The reason for the two layers is that ZERODUR does not anodically bond to itself. The first layer of tantalum is an adhesive layer for sticking purposes and provides for electrical conductivity; the second layer of silicon is for bonding.

The metal coated part of discs 105X and 105Y are aligned and the discs clamped to one another as shown in FIG. 14 by the arrows 155, 156 and electrostatically bonded to one another by use of a positive D.C. electrode being applied to the outer silicon layer on the surface 152 and a negative D.C. electrode being applied to the opposite surface 157. The temperature then is raised to 350° C. and 450 volts D.C. is applied for ten minutes to bond the parts 105X, 105Y to one another.

It should be noted that the bonding temperature $T_o$ of the composite disc 105 is 350° C. and when the composite disc cools to room temperature the difference in the temperature coefficients of expansion produces a displacement of the disc at room temperature from the disc position at the time of bonding. The temperature of 350° C. is selected as a temperature suitable for the anodic bonding process. Thereafter, when the disc 105 is subjected to an increase in temperature over room temperature, there is a predictable change in the displacement of the composite disc which is measurable by the capacitance relationships. Although the ZERODUR discs could be bonded to one another with a glass frit, the temperature for bonding would be about 900° C. When cooled, this would result in a large distortion compared to that produced by the operating temperature range and thus limit the resolution of the measurement made by the capacitances.

After the composite disc 105 is bonded, the unit is placed in an acid bath which dissolves the exposed side and top film metalizations. A thick film of gold is then applied to each indentation for providing an electrical attaching terminus. Next, the capacitor films 112, 115 are applied by sputtering. A typical pattern is shown for the annular film 112 in FIG. 14B. The film 112 is spaced from the indentions 105B and 105C but is in contact with the indentation 105A and the thick film in the indentation.

The end support members 103 and 107 are similarly prepared as follows: as shown in FIG. 14(C-E) there is a small diameter opening 160 (0.022 inches in diameter) through the center of each end support member. The length of the opening 160 is coated with a thick film of gold 163 for electrical conductivity. End support member 107 is shown in FIGS. 14(C-E) for illustrative purposes. The annular facing surface 109 is sputtered with a metal film to form an annular plate portion 111 exclusive of the indentations 107(A and C) but is in contact with the metal film in the indentation 107B. The metal film of the plate portion 11 consists of an adhesive layer of tantalum 800 Angstroms thick overlaid with a conductive layer of platinum 2500 Angstroms thick overlaid with an insulating layer of silicon dioxide 5000 Angstroms thick. The silicon dioxide layer provides protection against possible shorting in the event a minute particle should become lodged between the plates.

Figure 15:
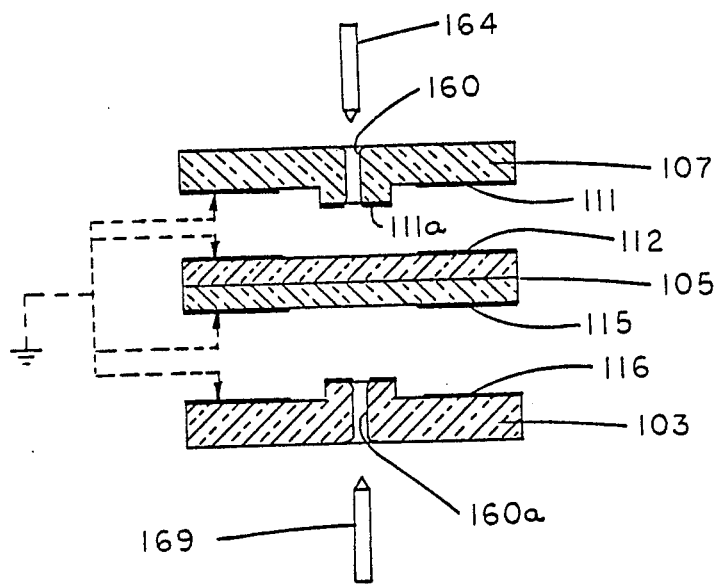
FIG. 15 is a schematic representation of another step in the process involved in the present invention.

The central and upstanding post portion 106 has the films of tantalum and silicon applied as shown by the numeral 111a and as described above for joining purposes. When the two end support members 103, 107 and the composite disc member 105 are aligned relative to one another as shown in FIG. 15 and are sandwiched or brought into contact with one another, centering electrodes 164, 169 engage the openings 160, 160a to clamp the assembly in an assembly position. Next, the annular film plates 111, 112, 115, and 116 are connected to an electrical ground (shown by dashed line). A positive voltage is applied to the electrode 164 while the negative electrode 169 is connected to the electrical ground on the film plates. While the voltage is applied the elements are subjected to a temperature of 350° C. while 450 volts D.C. are applied for twenty minutes. This bonds the element 107 to the element 105. Since all capacitance plates are connected to the negative or ground potential there is no voltage across the spacing gap which eliminates any electrostatic field tending to collapse the elements to one another and eliminates any sparking or arcing between the capacitor plates as might occur because of the small gap spacing.

Next, the positive D.C. voltage is connected to the electrode 169 and while at the temperature of 350°, a voltage of 450 volts D.C. is applied for twenty minutes to bond the elements 103 and 105 to one another. While the D.C. voltage is applied in separate steps to bond or join the respective elements, the application of voltage could be done simultaneously if it is not important to monitor the D.C. currents individually. By monitoring the sealing D.C. currents independently, the quality of the process binding can be monitored.

Figure 18A:
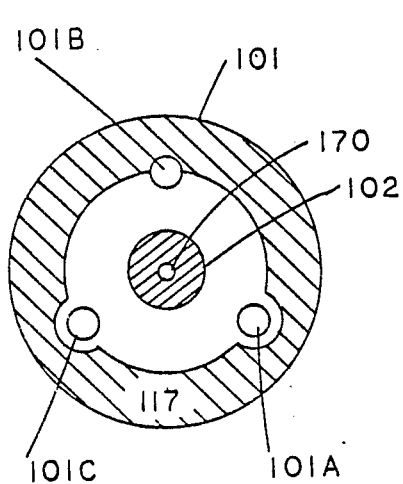
FIG. 18A is a plan view of one surface of the base support element 101 of the sensor unit of the invention.
Figure 18B:
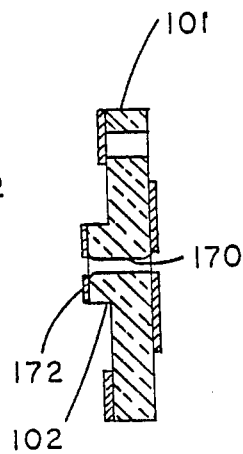
FIG. 18B is a side view in cross-section of the base support element 101 of FIG. 18A.
Figure 18C:
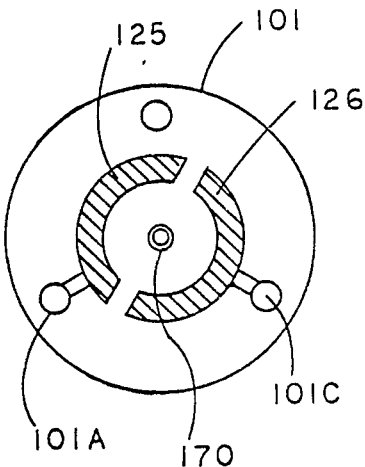
FIG. 18C is a plan view of the other surface of the base support element 101 of FIG. 18A.
Figure 19:
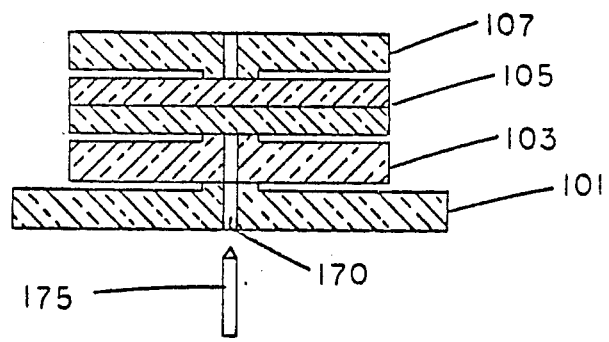
FIG. 19 is a schematic representation of another step in the process involved in the present invention.

The support member 101 is formed as shown in FIGS. 18A, 18B, 18C with an annular metal film 117 and a gold metal film in an opening 170. The film 117 circumscribes and does not contact the openings 101A and 101C. The film 117 does contact a peripheral portion of the opening 101B so that the gold thick film in the opening 101B electrically contacts the film 117. The contact films 125, 126 are respectively connected by film tabs to gold thick film in the openings 101A and 101C. The end surface of the center post 102 is coated with films of tantalum and silicon applied as shown by the numeral 172 as described above. The assembly is connected together as shown in FIG. 19 and joined by the application of 450 volts D.C. at 350° C. for twenty minutes with the positive anode 175 connected to the opening 170 and the negative anode connected to the film plates on each of the elements to avoid arcing as described above.

Advantages of the Structure

The isolation diaphragm 70 (FIG. 2) is able to collapse completely flat on the mounting face 35 with no trapped volume of gas except for the gas in the center hole 41, the capacitance gaps $C_1$, $C_2$, the base support gap, and the clearance spaces about the sensor unit 50. The volume of gas in the diaphragm space 76 is thus large because of a large diameter diaphragm as compared to a very small volume of gas in the sensor. The ZERODUR composite element of the sensor unit 50 is totally stress isolated by a small clearance gap around the unit. Also, the pedestal base support member 101 (FIG. 3) serves to isolate any mounting stresses from the capacitance measurement structure by virtue of its small central attachment post 102. The electron beam weld 62 does not have to be capable of holding high pressure loading since the pressure is the same on both sides of the weld. There are no stresses on the sensor unit 50 due to pressure other than hydrostatic compression. The rigidity of each element of the capacitance structure is chosen to be identical so that the effects of gravity or vibration cancel. There is no use of adhesives since the use of adhesives or elastomers could present a problem in that high pressure gas could permeate the materials and cause swelling or failure.

For low pressure construction, the diameter of the isolation diaphragm 70 can be increased even further to increase its compliance and reduce its required stroke.

A fill gas with a higher dielectric constant can be utilized to provide additional sensitivity for low pressure units. The higher critical temperature of these gases will not be a problem if the maximum pressure is too low to liquify the gas.

The vacuum reference module is necessary to provide a vacuum reference for the system. Since the laminar composite disc of the sensor unit is constructed of ZERODUR elements which have very low expansion coefficients and since a vacuum has no gas density to be temperature dependent then the temperature measurement of the sensor unit is not so critical. Other materials can be substituted for ZERODUR. For example, Quartz is a suitable material when used in conjunction with Vycor or Corning ULE7971 Fused Silica for the composite disc. The bonding procedures would require modification for the different materials.

Alternate Diaphragm

Figure 18:
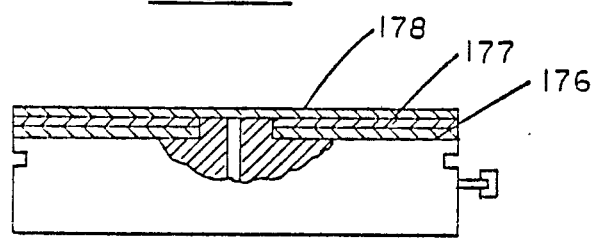
FIGS. 17 & 18 are side views of a modified form of diaphragms for the present invention.
Figure 17:
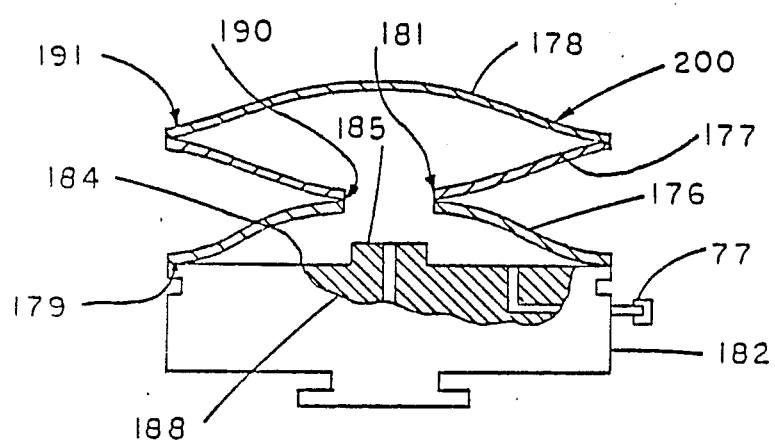

Referring now to FIGS. 17 & 18, an alternate form of diaphragm is illustrated. This form of diaphragm will perform superior to the diaphragm 70 (FIG. 2) in instances where an increase in the obtainable deflection of the composite disc 105 is desirable. As illustrated, the diaphragm 200 is constructed with two annular members 176, 177 and with one circular member 178 of Kovar approximately 0.003 inches thick. The base annular member 176 has an outer annular surface area at 179 which is sealingly connected to an annular surface area on a cylindrically shaped base member 182. The base member 182 has an upper surface 184 with a central pedestal portion 185. The central, circularly shaped pedestal portion 185 is approximately 0.005 inches high relative to the surface 184. The pedestal portion 185 has a central access port 188 which opens to the sensor cavity containing a sensor unit (not shown). An inner annular surface on an annular member 176 is sealingly connected to the inner annular surface area on the intermediate annular member 177 at a location generally marked as 181. The central bore 190 of the base annular member 176 and the intermediate annular member 177 are sized to closely fit around the circumference of the pedestal portion 185. The outer circular enclosure member 178 has an annular edge surface 191 which sealingly connects to an annular edge surface of the intermediate annular member 177.

In an expanded or extended condition as shown in FIG. 17, the outer circular member 178 and the inner annular member 176 and the intermediate member 177 have convoluted configuration. When fluid under pressure is applied to the external surface of the diaphragm in excess of the internal pressure in the diaphragm, the gas within the diaphragm is compressed and the diaphragm contracts toward the position shown in FIG. 18. The diaphragm is initially adjusted by a predetermined internal volume of gas for the desired operating range. In the event of overload, the diaphragm will collapse on the unit to a position where it will not be adversely affected.

The sealing of joints 191, 190, and 179 is obtained by coating on the edges of facing elements with an annular ring of oxygen free copper. The copper coated surfaces are then abutted and cold welded by applying pressure which bonds the copper to provide an impermeable seal. This process is required for joining or bonding of two thin metal sheets to one another.

It will be apparent to those skilled in the art that various changes may be made in the invention without departing from the spirit and scope thereof and therefore the invention is not limited by that which is enclosed in the drawings and specifications but to as indicated in the appended claims.

I claim:

1. A pressure transducer for measuring a media under pressure by a capacitor device comprising:

electrical capacitor means arranged for developing two interrelated capacitance measurements where such two capacitance measurements are a function of the temperature of a gaseous medium in the capacitor means, and where such two capacitance measurements provide a defined total capacitance as a function of the dielectric value of said gaseous medium, said capacitor means having a temperature responsive element for affecting such two capacitance measurements as a function of a change in temperature in the gaseous medium in the capacitor means, and transfer means for translating a media under pressure to the gaseous medium as a function of the dielectric value of the gaseous medium.

2. The transducer as defined in claim 1 and further including a housing in said capacitor means having an enclosure chamber for containing said gaseous medium, said enclosure chamber having an access port, said transfer means including a diaphragm component attached to said housing and separating said access port from an exterior environment containing the medium under pressure.

3. The transducer as defined in claim 2 wherein said housing and said diaphragm component are constructed from the same materials.

4. The transducer as defined in claim 2 wherein the media under pressure is a liquid.

5. The transducer as defined in claim 2 wherein said capacitor means is constructed in a cylindrical configuration of attached disc members providing at least two annular recesses about a central axis and has metal film deposits on facing surfaces of each of said recesses for defining first and second capacitor means for deriving such two capacitance measurements.

6. The transducer as defined in claim 5 wherein the disc member between said annular recesses is comprised of two disc components of the same material arranged in a laminar composite where one of said disc components has a different thermal coefficient of expansion than the other said disc component.

7. The transducer as defined in claim 5 wherein said disc members have angularly displaced outer indentations for disposition of electrical connecting means.

8. The transducer as defined in claim 5, 6 or 7 and further including means for mounting and securing said transducer in said enclosure including a base support member attached to one of said disc members and a connector means sealingly received in a bore in the housing for positively locating said base support member in said enclosure.

9. The transducer as defined in claim 8 wherein said enclosure is a cylindrical bore with a counterbore and said base support member has an enlarged cylindrical base portion for receipt in said counterbore and for centering said transducer in said bore.

10. The transducer as defined in claim 5 wherein said disc members are constructed from the same materials.

11. The transducer as defined in claim 2 wherein said housing is in a chamber means filled with the media under pressure and said housing is entirely immersed in the media under pressure.

12. The transducer as defined in claim 5 or claim 10 wherein said disc members have the same thickness.

13. The transducer as defined in claim 2 wherein said gaseous medium is carbon tetrafluoride.

14. A pressure transducer for measuring a media under pressure by a capacitor device comprising:
an electrical capacitor device comprising first and second capacitor plate means arranged with a common capacitor plate means and having a defined total capacitance,
a reference gaseous dielectric medium in said capacitor device having a defined dielectric value,
translation means for changing said dielectric value of said gaseous medium as a function of a pressure media to be measured, and
said common capacitor plate means having a structure with dissimilar thermal coefficients of expansion for enabling predictable displacement of said common capacitor plate means relative to said first and second capacitor plate means as a function of temperature, said common capacitor plate means being located relative to said first and second capacitor plates for displacement relative to said first and second capacitor plate means without effectively changing said defined total capacitance.

15. The capacitor device as set forth in claim 14 wherein the device includes a cylindrically shaped enclosure with a counterbore and said capacitor plate means are cylindrically shaped to closely fit in said enclosure and have an enlarged cylindrical base portion to closely fit in said counterbore for independently mounting said capacitor device in said enclosure.

16. The capacitor device as set forth in claim 15 wherein an output connector device engages said base portion on said capacitor device and provides an electrical output means for said capacitor plate means.

17. The capacitor device as set forth in claim 15 wherein said enclosure has an access port extending to an exterior diaphragm component which is part of the translation means and which separates the gaseous dielectric medium in the enclosure and the pressure media to be measured.

18. The capacitor device as set forth in claim 14 wherein first and second capacitor plate means and said common capacitor plate means are annularly shaped metalized films which are disposed on cylindrically shaped disc members where the disc members are constructed of the same material and are separated from one another by smaller diameter cylindrically shaped connecting post parts.

19. The capacitor device as set forth in claim 18 wherein said disc members have the same thickness dimension.

20. The capacitor device as set forth in claim 18 or 19 wherein said disc members have angularly spaced peripheral indentations for the disposition of electrical connecting means.

21. In a pressure measurement system for measuring the temperature and density of a gas dielectric medium as a function of pressure media,
a capacitor device having outer interrelated capacitance plates respectively on outer support members which are in a fixed position relative to one another and having intermediate capacitance plates on an intermediate support member which is movable relative to said outer capacitance plates and outer support members as a defined function of temperature,
an enclosure chamber means for enclosing said capacitance device with a minimum volume capacity, said enclosure chamber means containing a gas dielectric medium, and
transfer means for transmitting pressure of a pressure media external to said enclosure chamber means to said gas dielectric medium where the density of the gas dielectric medium varies as a function of the pressure in the pressure media.

22. The pressure measurement system as set forth in claim 21 where in said enclosure chamber means and said transfer means are entirely immersed in a chamber containing said pressure media.

23. The pressure measurement system as set forth in claim 21 or 22 wherein said capacitor device is cylindrically shaped and is comprised of the first outer capacitance support member which supports one of said capacitance plates, the second outer capacitance support member which supports one of said capacitor plates and the intermediate capacitance support member which supports the intermediate capacitance plates where the intermediate capacitance plates respectively face said capacitance plates on said first and second outer capacitance support members, said capacitance plates being annularly formed and said support members being joined to one another by central cylindrically shaped post elements on the outer support members so that a capacitor formed by one of said capacitance plates and a facing capacitance plate has a spacing or gap substantially equal to the spacing or gap formed between the other of said capacitance plates and a facing capacitance plate.

24. The pressure measurement system as set forth in claim 23 wherein said capacitance support members have substantially equal thicknesses and are constructed of the same material.

25. The pressure measurement system as set forth in claim 23 wherein said intermediate capacitance support members has equal portions of its structure respectively having a different coefficient of expansion as a function of temperature.

26. The pressure measurement system as set forth in claim 23 wherein a cylindrically shaped base support element is joined to one of said outer capacitance support members by a central cylindrically shaped post element and said base support element is sized to be received in a counterbore in a chamber means so as to space the outer peripheral surfaces of the capacitance elements from inner surface of the chamber means which enclose said capacitance device.

27. The pressure measurement system as defined in claim 26 wherein said enclosure chamber means consists of at least two structures made of metal and sealed relative to one another by a weld.

28. A transducer for utilizing the temperature and the dielectric constant value of a gas in a capacitance device as variables for measuring pressure of the gas in the capacitance device as a function of an external unknown pressure to be measured, said transducer comprising:

capacitor means defined by capacitor plate elements and intermediate electrical capacitor plate elements where said plate elements are supported by outer support members and an intermediate support member and where one outer capacitor plate element and one intermediate capacitor plate member define a first capacitance $C_1$ and where the other outer capacitor plate element and the other intermediate capacitor plate define a second capacitance $C_2$ and where the total capacitance between the outer capacitor plate elements is a function of $C_1$ and $C_2$, an enclosure means for said capacitor means for containing a dielectric gas between said plate elements, diaphragm means for translating pressure exterior to said enclosure means into a functionally related pressure of a dielectric gas within said enclosure means, said intermediate support member having a displacement relative to said outer support members as a function of gas temperature within said enclosure means, and said outer support members being relatively stationary so that the total capacitance $C_T$ is a function of the dielectric value of the gas.

29. The transducer as set forth in claim 28 and further including
a base support member attached to one of said outer support members for mounting said transducer in the enclosure means solely by the base support member thereby to isolate said transducer from external effects of the distortion or stress induced into the enclosure means.

30. The transducer as set forth in claim 29 wherein said enclosure means is sized to closely circumscribe the external periphery of said transducer for reducing the external internal volume available for the dielectric gas media.

31. The transducer as set forth in claim 30 wherein said diaphragm means has a displacement relative to the volume of the enclosure means for the range of pressures to be measured.

32. The transducer as set forth in claim 31 wherein said dielectric gas media is non-liquifying under the conditions of measurement.

33. The transducer as set forth in claim 32 wherein said diaphragm means includes an annular metal, flexible base member attached at its periphery to a base member, an annular metal flexible intermediate member attached at its inner periphery to the base member and a cylindrical metal flexible outer member attached at its outer periphery to said intermediate member.

34. The transducer as set forth in claim 28 and further including an electronic processing channel means for sequentially processing input signals,
a reference transducer having capacitor means $C_3$ defined by reference plate means disposed on reference support members within a vacuum enclosure,
switching means for sequentially processing capacitance values of $C_1$ $C_2$, and $C_3$ through said channel means.

35. The transducer as set forth in claim 28 wherein said plate elements are annularly shaped and said support members are interconnected by cylindrically shaped post members.

36. The transducer as set forth in claim 35 wherein each of said outer support members is equal in thickness to the thickness of said intermediate support member.

37. The transducer as set forth in claim 36 wherein said posts respectively provide spacing gaps of approximately 200 micro inches.

38. The transducer as defined in claim 28 and further including means for processing said capacitance values of $C_1$ and $C_2$ for deriving said external unknown pressure measurement.

39. The capacitance type transducer having a dielectric gas media, said transducer including:
capacitor means disposed in an enclosure member, said capacitor means being sized relative to said enclosure member for defining a minimum internal volume available for the dielectric gas media,
diaphragm means attached to said enclosure member for compressing said dielectric gas media as a function of pressure for the range of pressures to be measured,
said diaphragm means having an annular metal, flexible base member attached at its periphery to a base member, an annular metal flexible intermediate member attached at its inner periphery to the base member and a cylindrical metal flexible outer member attached at its outer periphery to said intermediate member.

40. The transducer as set forth in claim 39 wherein said dielectric gas media is non-liquifying under the conditions of measurement.

41. A transducer construction for use in translating pressure from a media to a gas filled enclosure comprising:
an enclosure means having a flat surface with an upstanding cylindrically shaped post member having a height dimension "d", said post member having a central opening to the interior of said enclosure means,
a first annular metal and flexible element having a central opening sized to be received over said post member and having a thickness "$t_1$",
a second annular metal and flexible element having a central opening sized to be received over said post member and having a thickness "$t_2$" where $t_1$ plus $t_2$ is substantially equal to "d", and
a third cylindrically metal and flexible element disposed over said second element, said elements being bonded to one another at the respective edges to provide a gas tight seal,
said elements being collapsible upon said flat surface to a near zero volume and expandable to an expanded condition.

42. The transducer as set forth in claim 41 where said elements are attached to an another and to said enclosure means by sealing connections on the annular edge surface of said elements.

43. The transducer as set forth in claim 41 or 42 wherein two or more additional annular metal and flexible elements are interposed in the stack of elements for expanding the range of expansion of the flexible elements.

44. A method for measuring the pressure of a media with a capacitor device having electrical capacitor means arranged for developing two interrelated capacitance measurements $C_1$ and $C_2$ where such two capacitance measurements are a function of the temperature of a gaseous medium in the capacitor means, and where such two capacitance measurements are a function of the dielectric value of said gaseous medium comprising the steps of:

measuring the capacitance values $C_1$ and $C_2$ while said dielectric gas is subjected to the pressure to be measured while maintaining the physical parameters for the sum of $C_1+C_2$ substantially constant in series relationship except for the dielectric value of the gas and while varying the values of $C_1$ and $C_2$ as a function of the temperature of the gas, and combining the capacitance values for obtaining the pressure to be measured as a function of the dielectric value of the gas and the temperature of the gas.

45. A method for utilizing the temperature and the dielectric constant value of a gas in a capacitance device as variables for measuring pressure of the gas in the capacitance device as a function of an external unknown pressure to be measured, said method comprising the steps of:

obtaining a first capacitance value $C_1$ and a second capacitance value $C_2$ from a capacitor means having capacitor plate elements and intermediate electrical capacitor plate elements where said plate elements are supported by outer support members and an intermediate support member and where one outer capacitor plate element and one intermediate capacitor plate member define a first capacitor $C_1$ and where the other outer capacitor plate element and the other intermediate capacitor plate define a second capacitor $C_2$, maintaining the total capacitance between the outer capacitor plate elements as a constant function of the sum of the capacitances $C_1$ and $C_2$, translating pressure exterior to said capacitor means into a functionally related pressure of a dielectric gas between said plate elements, combining said capacitance values of $C_1$ and $C_2$ as a function of the gas temperature within said enclosure means, and combining said capacitance values of $C_1$ and $C_2$ as a function of the density of said gas so that the exterior pressure can be derived from the gas temperature and the gas density.

46. In a well tool for use in obtaining pressure measurements in a well bore, housing means adapted for passage through a well bore, pressure sensor means disposed within said housing means for deriving a measurement of well pressure of well fluid in a well bore, said pressure sensor means including a housing member within said housing means, said housing member having a first chamber for enclosing a reference capacitor device in a vacuum condition in said first chamber, said housing member having a second chamber with access to the well fluid to be measured, an enclosure member disposed and supported within said second chamber so as to immerse said enclosure member in the well fluid, a measuring capacitor device and a dielectric gas diaposed within said enclosure member, said measuring capacitor device having pressure translation means with access to the well fluid for translating well fluid pressure to pressure in the dielectric gas, said measuring capacitor device including outer capacitor support means and an interediate capacitor support means defining two sets of spaced apart surfaces, metal material on said spaced apart surfaces for defining capacitor plates, said intermediate capacitor support means being responsive to temperature of the dielectric gas for positioning said intermediate capacitor support means relative to said outer capacitor support means as a function of temperature, and means for obtaining capacitance measurements from said capacitor plates.

47. The apparatus as set forth in claim 46 and further means for processing capacitance values from said reference capacitor device and said measuring capacitor devices to develop a pressure measurement.

48. The apparatus as set forth in claim 46 wherein said pressure translating means includes a metal diaphragm.

49. A pressure transducer for measuring pressure of a fluid medium by a capacitor device comprising:

electrical capacitor means arranged for developing interrelated first and second capacitance measurements where such two capacitance measurements are a function of the temperature of a gaseous medium in the capacitor means, and where such two capacitance measurements provide a defined total capacitance as a function of the dielectric value of said gaseous medium, said capacitor means having a pair of capacitors each having one capacitor element which is displaceable with respect to another capacitor element of a capacitor for affecting its capacitance measurement as a function of a change in temperature in the gaseous medium in the capacitor means, transfer means for translating the pressure of said fluid medium to said gaseous medium, and means responsive to said first and second capacitance measurements for deriving the pressure of said fluid medium.

50. The transducer as defined in claim 49 and further including a housing in said capacitor means having an enclosure chamber for containing said gaseous medium, said enclosure chamber having an access port to a fluid medium, said transfer means including a diaphragm component attached to said housing and separating the fluid medium from said access port from said gaseous medium.

51. The transducer as defined in claim 50 wherein said capacitor means is constructed in a cylindrical configuration of attached disc members providing at least two annular recesses about a central axis and having metal film deposits on facing surfaces in each of said recesses for defining said capacitors.

52. The transducer as defined in claim 51 wherein the disc member between said annular recesses is comprised of two disc components of the same material arranged in a laminar composite where one of said disc components has a different thermal coefficient of expansion than the other said disc component.

* * * * *